(12) United States Patent
Sirotkin et al.

(10) Patent No.: US 11,197,332 B2
(45) Date of Patent: *Dec. 7, 2021

(54) SEPARATION OF CONTROL PLANE AND USER PLANE IN NEW RADIO (NR) SYSTEMS

(71) Applicant: Apple Inc., Cupertino, CA (US)

(72) Inventors: Alexander Sirotkin, Tel-Aviv (IL); Yifan Yu, Haidian District (CN); Min Huang, Beijing (CN); Jaemin Han, Portland, OR (US); Feng Yang, Beijing (CN)

(73) Assignee: Apple Inc., Cupertino, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/615,081

(22) PCT Filed: Jun. 19, 2018

(86) PCT No.: PCT/US2018/038284
§ 371 (c)(1),
(2) Date: Nov. 19, 2019

(87) PCT Pub. No.: WO2018/236867
PCT Pub. Date: Dec. 27, 2018

(65) Prior Publication Data
US 2020/0178326 A1 Jun. 4, 2020

Related U.S. Application Data

(60) Provisional application No. 62/521,958, filed on Jun. 19, 2017.

(51) Int. Cl.
*H04W 76/12* (2018.01)
*H04W 80/02* (2009.01)
*H04W 92/20* (2009.01)

(52) U.S. Cl.
CPC ............ *H04W 76/12* (2018.02); *H04W 80/02* (2013.01); *H04W 92/20* (2013.01)

(58) Field of Classification Search
CPC ..... H04W 76/12; H04W 80/02; H04W 92/20; H04W 76/10; H04W 76/11; H04W 76/27;
(Continued)

(56) References Cited

U.S. PATENT DOCUMENTS

2013/0294403 A1 11/2013 Srinivasan
2018/0020456 A1* 1/2018 Wan ...................... H04W 76/20
(Continued)

FOREIGN PATENT DOCUMENTS

WO WO-2017118935 A1 * 7/2017 .............. H04W 8/26

OTHER PUBLICATIONS

"International Application Serial No. PCT/US2018/038284, International Search Report dated Dec. 19, 2018", 4 pgs.
(Continued)

*Primary Examiner* — Mewale A Ambaye
(74) *Attorney, Agent, or Firm* — Kowert, Hood, Munyon, Rankin & Goetzel, P.C.

(57) ABSTRACT

Embodiments of a Next Generation Node B (gNB) are described herein. The gNB may be configured with logical nodes, including a gNB central unit (gNB-CU) and a gNB distributed unit (gNB-DU). The gNB-CU may include a gNB-CU control plane (gNB-CU-CP) for control-plane functionality, and a gNB-CU user plane (gNB-CU-UP) for user-plane functionality. The gNB may initiate an E1 interface setup procedure, a bearer context setup procedure, and a UE context setup procedure to establish a UE context that includes a signaling radio bearer (SRB) and a data radio bearer (DRB) configuration. The UE context setup request message may be configured to include quality-of-service parameters for the DRB configuration.

20 Claims, 15 Drawing Sheets

(58) Field of Classification Search
CPC ... H04W 28/02; H04W 80/00; H04W 88/085; H04W 92/22; H04W 92/24; H04W 92/16; H04W 92/045; H04W 92/04; H04W 88/08
See application file for complete search history.

(56) References Cited

U.S. PATENT DOCUMENTS

| | | | | |
|---|---|---|---|---|
| 2019/0069333 | A1* | 2/2019 | Kim | H04W 36/0033 |
| 2019/0246310 | A1* | 8/2019 | Han | H04W 28/0263 |
| 2019/0297652 | A1* | 9/2019 | Yang | H04W 76/10 |
| 2019/0320476 | A1* | 10/2019 | Wang | H04W 28/0268 |
| 2019/0342800 | A1* | 11/2019 | Sirotkin | H04B 17/318 |

OTHER PUBLICATIONS

"International Application Serial No. PCT/US2018/038284, Written Opinion dated Dec. 19, 2018", 5 pgs.
"Stage3 TP for UE context management in F1AP", CATT, R3-171465, 3GPP TSG-RAN WG3#96, Hangzhou, P. R. China, <http://www.3gpp.org/ftp/TSG_RAN/WG3_Iu/TSGR3_96/Docs/>, (May 6, 2017).
Ericsson, "On the functional distribution over the F1 interface", R3-171727, 3GPP TSG-RAN WG3 #96, Hangzhou, China, <http://www.3gpp.org/ftp/TSG_RAN/WG3_Iu/TSGR3_96/Docs/>, (May 6, 2017).
Ericsson, et al., "Separation of CP and UP", R3-171725, 3GPP TSG-RAN WG3 #96, Hangzhou, China, <http://www.3gpp.org/f tp/TSG_RAN/WG3_Iu/TSGR3_96/Docs/>, (May 6, 2017).
Ericsson, et al., "Transmission of RRC messages", R3-171726, 3GPP TSG-RAN WG3 #96, Hangzhou, China, <http://www.3gpp.org/f tp/TSG_RAN/WG3_Iu/TSGR3_96/Docs/>, (May 6, 2017).
ZTE; "TP for UE Radio Bearer Management"; 3GPP TSG RAN WG3 Meeting #96 R3-171598; Hangzhou, P.R. China, May 15, 2017; 11 Pages.
Ericsson; "F1 interface functions"; 3GPP TSG-RAN WG3 #95bis Tdoc R-171724; Spokane, USA, Apr. 3, 2017; 5 Pages.
Huawei; "TP on UE Context Management on F1"; NB3GPP TSG RAN WG3 Meeting #96 R3-171853; Hangzhou, China, May 15, 2017; 3 Pages.
Ericsson; "Separation of CP and UP"; 3GPP TSG RAN Meeting #76 RP-171215; West Palm Beach, Florida, USA, Jun. 5, 2017; 2 Pages.
Extended European Search Report for Patent Application No. EP 18820450; dated Feb. 9, 2021; 10 pages.

* cited by examiner

SEPARATION OF CONTROL PLANE AND USER PLANE IN NEW RADIO (NR) SYSTEMS

PRIORITY CLAIM

This application is a U.S. National Stage Filing under 35 U.S.C. 371 from International Application No. PCT/US2018/038284, filed Jun. 19, 2018 and published in English as WO 2018/236867 on Dec. 27, 2018, which claims priority to U.S. Provisional Patent Application Ser. No. 62/521,958, filed Jun. 19, 2017, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to control plane functionality and/or user plane functionality. Some embodiments relate to splitting of control plane functionality and user plane functionality.

BACKGROUND

Base stations and mobile devices operating in a cellular network may exchange data. Functionality related to various protocol layers may be implemented in a base station to support communication with mobile devices. In an example scenario, a large number of mobile devices may communicate with the base station. In another example scenario, performance targets for a mobile device, such as latency, delay and/or other, may be challenging for the base station to meet. Accordingly, there is a general need for methods and systems to implement communication between the base station and the mobile devices in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
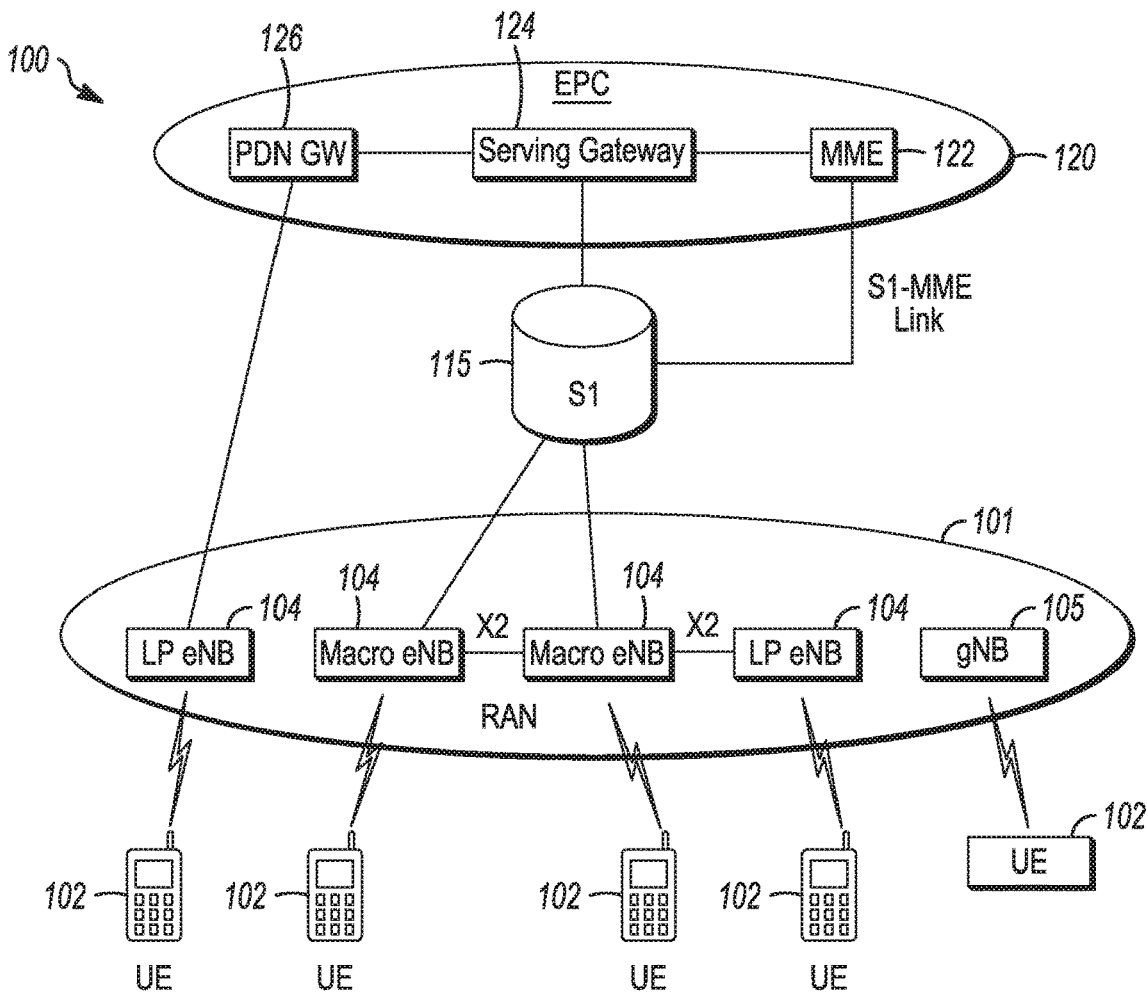
FIG. 1A is a functional diagram of an example network in accordance with some embodiments.
Figure 1A:
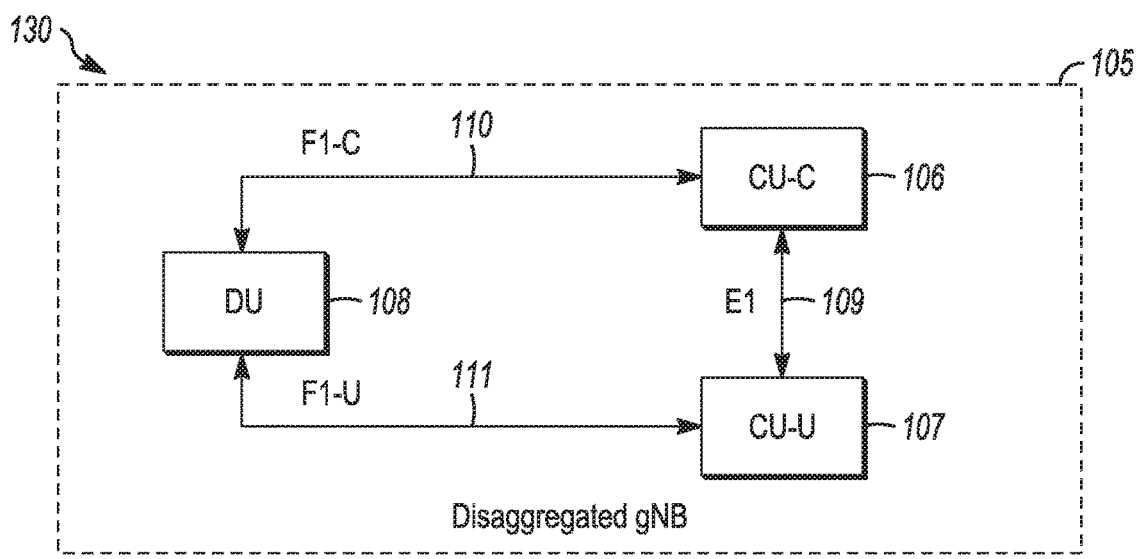
Figure 1B:
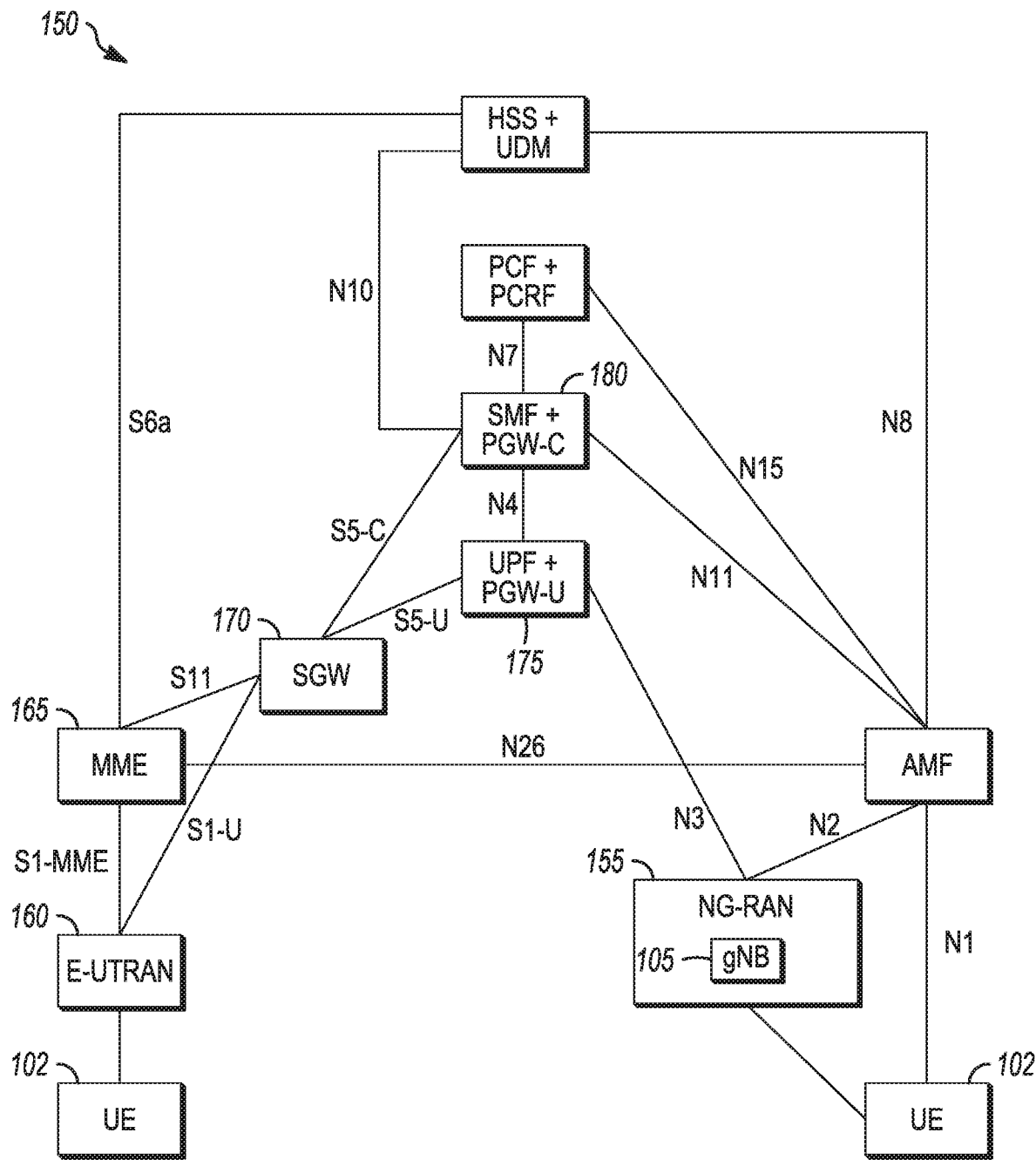
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW)

124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, the gNB 105 may include multiple components. In a non-limiting example shown in 130, the gNB 105 may comprise one or more of: a central unit control (CU-C) entity 106, a central unit user (CU-U) entity 107, a distributed unit (DU) 108 and/or other component(s). The CU-C entity 106 and the CU-U entity 107 may communicate over the E1 interface 109, although the scope of embodiments is not limited in this respect. The CU-C entity 106 and the DU 108 may communicate over the F1-C interface 110, although the scope of embodiments is not limited in this respect. The CU-U 107 entity and the DU 108 may communicate over the F1-U interface 111, although the scope of embodiments is not limited in this respect. In some embodiments, an F1 interface may comprise the F1-U interface 110 and the F1-C interface 111.

In some embodiments, the CU-C entity 106, the CU-U entity 107, and the DU 108 may be part of a disaggregated gNB 105. One or more of the CU-C entity 106, the CU-U entity 107, and the DU 108 may be co-located, in some embodiments. One or more of the CU-C entity 106, the CU-U entity 107, and the DU 108 may not necessarily be co-located, in some embodiments. Other arrangements are possible, including arrangements in which two or more of the CU-U entity 107, the CU-C entity 106 and the DU 108 are co-located.

The scope of embodiments is not limited to arrangements in which the CU-C entity 106, the CU-U entity 107, and the DU 108 are part of a disaggregated gNB 105, however. In some embodiments, one or more of the techniques, operations and/or methods described herein may be practiced by a CU-C entity 106, a CU-U 107 entity and/or a DU 108 that may not necessarily be included in a disaggregated gNB 105.

References herein to communication between the gNB 105 and another component (such as the UE 102, MME 122, SGW 124 and/or other) are not limiting. In some embodiments, such communication may be performed between the component (such as the UE 102, MME 122, SGW 124 and/or other) and one of the CU-C entity 106, CU-U entity 107, DU 108.

References herein to an operation, technique and/or method performed by the gNB 105 are not limiting. In some embodiments, such an operation, technique and/or method may be performed by one of the CU-C entity 106, CU-U entity 107, DU 108.

In some embodiments, one or more of the UEs 102, gNBs 105, CU-C entity 106, CU-U entity 107, DU 108 and/or eNBs 104 may be configured to operate in accordance with an NR protocol and/or NR techniques. References to a UE 102, eNB 104, CU-C entity 106, CU-U entity 107, DU 108 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below. In some embodiments, the UE 102 may transmit signals to a component of a disaggregated gNB 105 (such as the DU 108). In some embodiments, the UE 102 may receive signals from a component of a disaggregated gNB 105 (such as the DU 108).

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical downlink control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
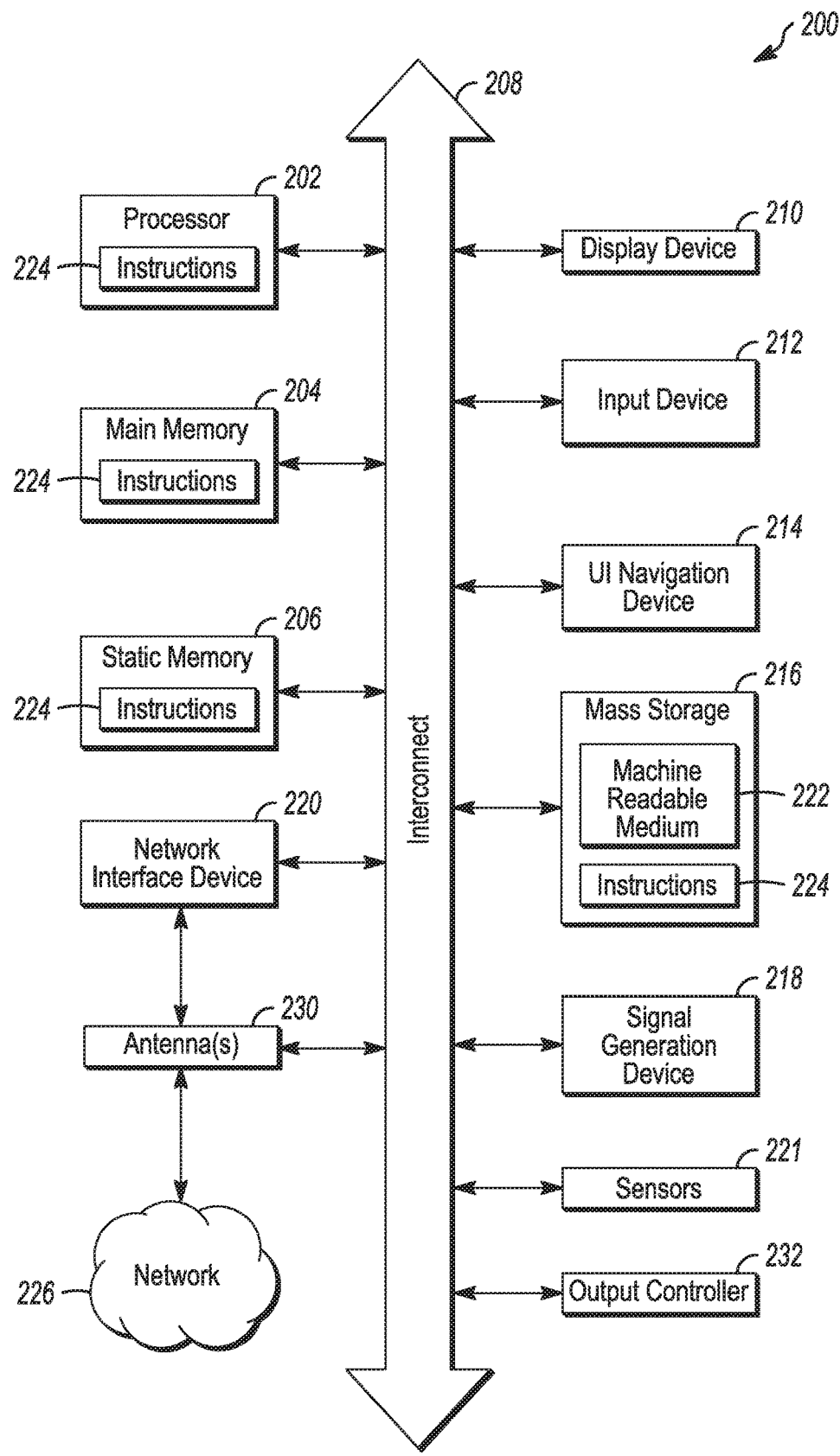
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, CU-C entity 106, CU-U entity 107, DU 108, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks: magneto-optical disks: Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
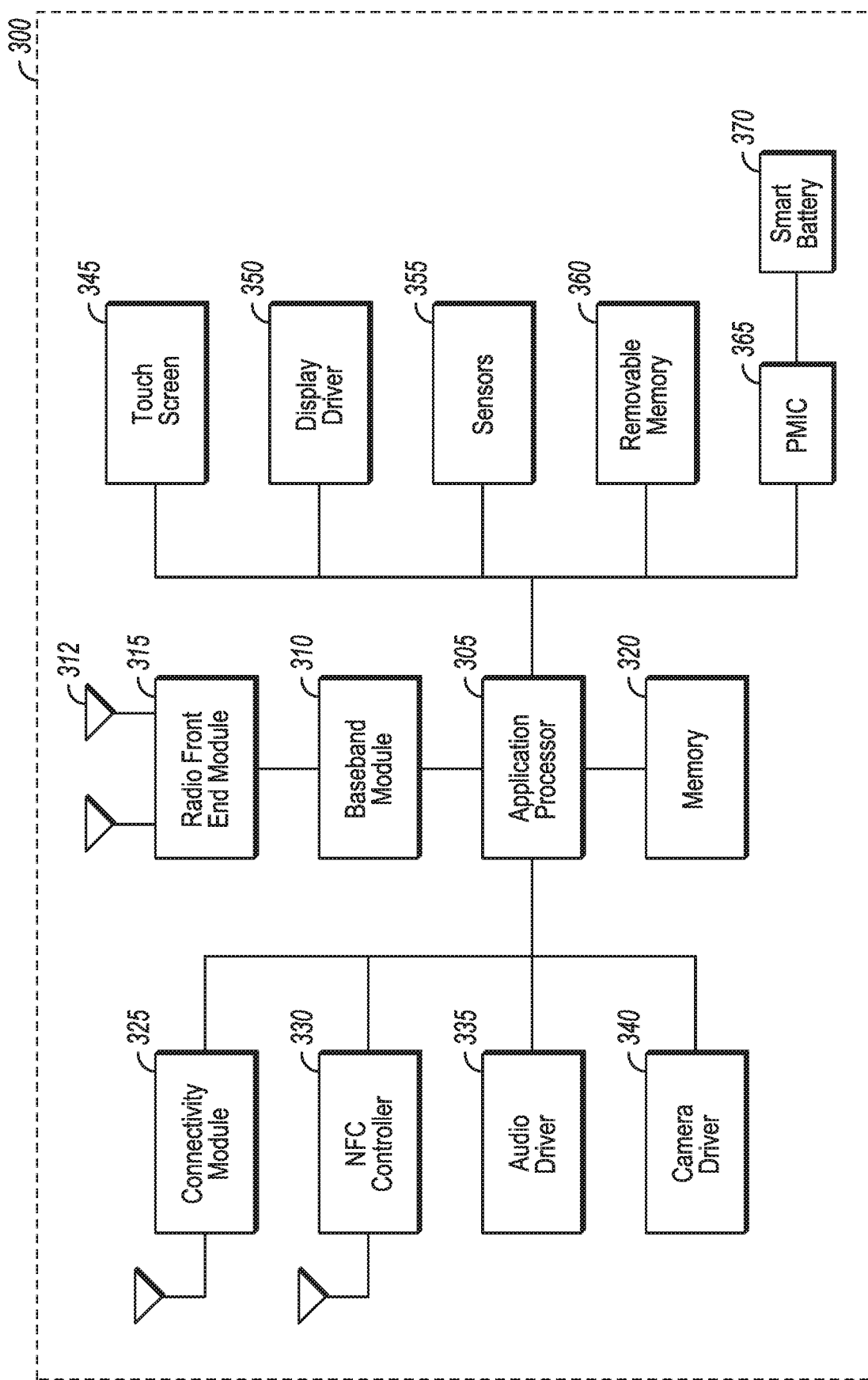
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
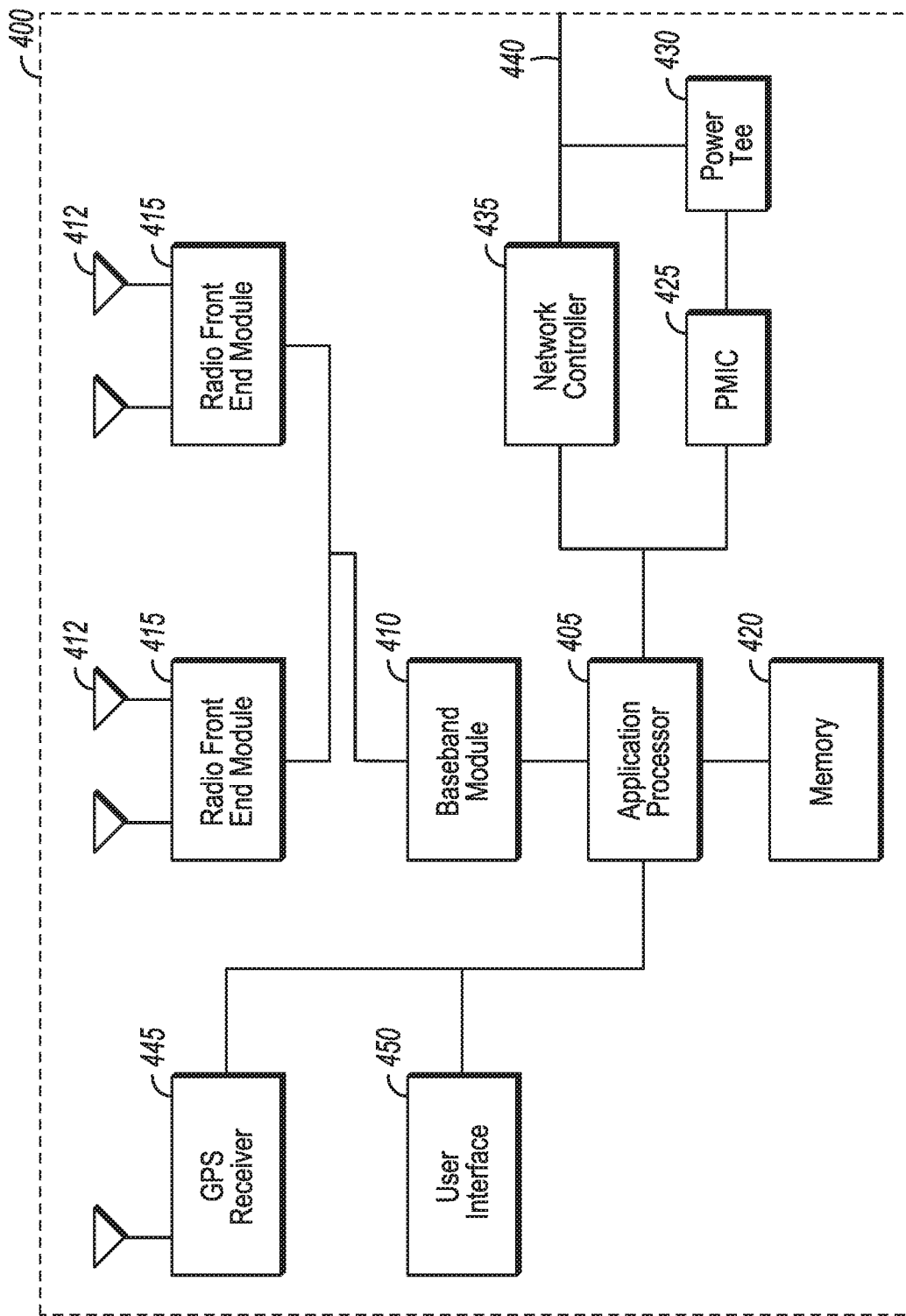
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a CU-C entity 106, a CU-U entity 107, a DU 108, an apparatus of a CU-C entity 106, an apparatus of a CU-U entity 107, an apparatus of a DU 108, a base station and/or an apparatus of a base station may include one or more of the components shown in one or more of FIGS. 2, 4, and 5. In some embodiments, such an eNB, gNB, CU-C entity 106. CU-U entity 107, DU 108, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose 10, memory card controllers such as SD/MMC or similar, USB interfaces, MIPI interfaces and Joint Test Access Group (JTAG) test access ports.

1 In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
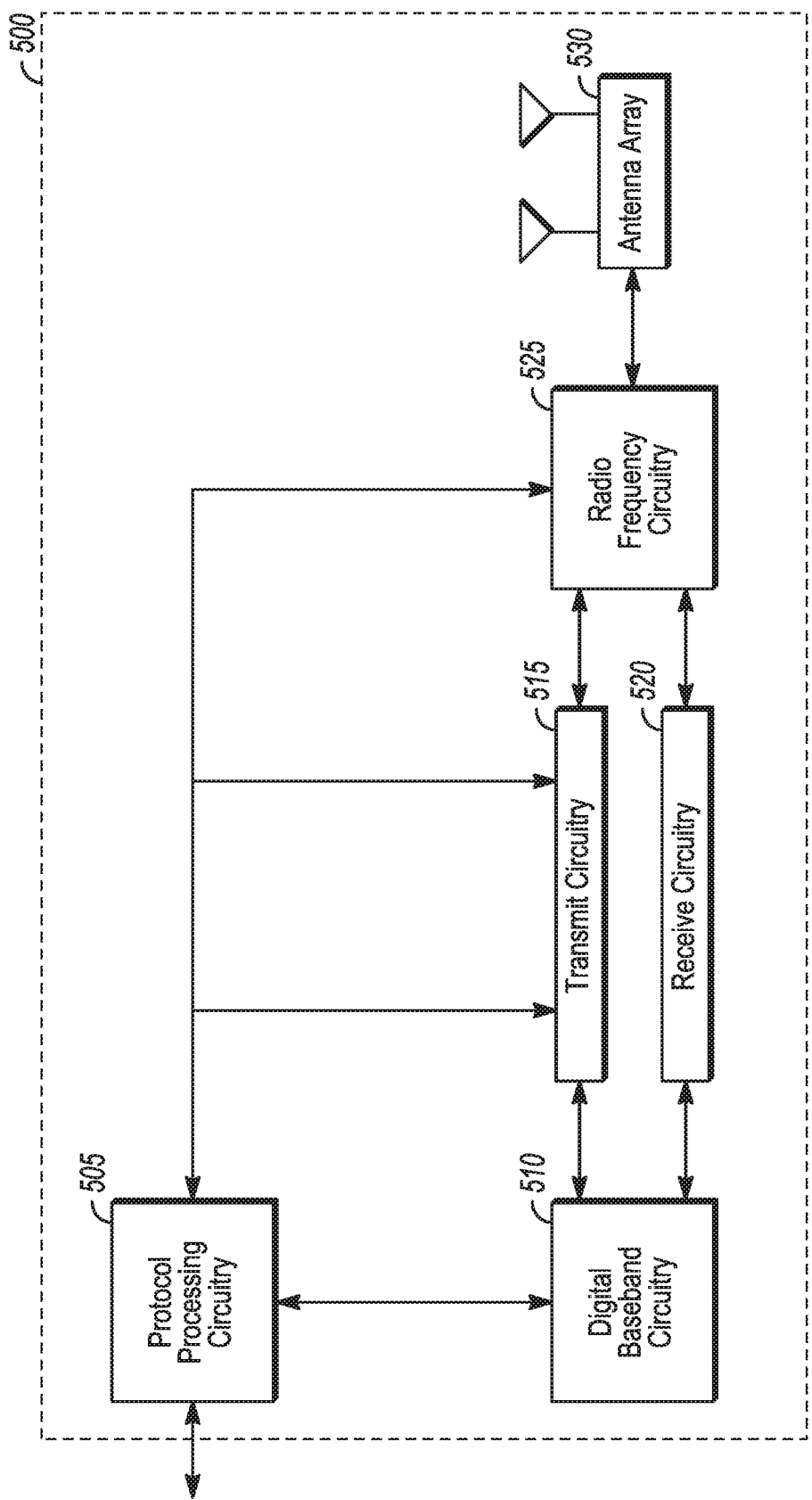
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, CU-C entity 106, CU-U entity 107, DU 108, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, CU-C entity 106, CU-U entity 107, DU 108, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, CU-C entity 106, CU-U entity 107, DU 108, user device 300, base station 400, machine 200 and/or other device described herein may be configured to operate in accordance with 3GPP standards, although the scope of the embodiments is not limited in this respect. In some embodiments, the UE 102, eNB 104, gNB 105, CU-C entity 106, CU-U entity 107. DU 108, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, CU-C entity 106, CU-U entity 107, DU 108, user device 300, base station 400, machine 200 and/or other device described herein may be configured to operate according to other protocols or standards, including IEEE 802.11 or other IEEE standards. In some embodiments, the UE 102, eNB 104, gNB 105, CU-C entity 106, CU-U entity 107, DU 108, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, CU-C entity 106, CU-U entity 107, DU 108, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, CU-C entity 106, CU-U entity 107, DU 108, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB. In addition, techniques and operations described herein that refer to the CU-C entity 106, may be applicable to an apparatus of a CU-C entity. In addition, techniques and operations described herein that refer to the CU-U entity 107 may be applicable to an apparatus of a CU-U entity. In addition, techniques and operations described herein that refer to the DU 108 may be applicable to an apparatus of a DU.

It should be noted that some of the descriptions herein may refer to performance of operations, methods and/or techniques by elements such as the CU-C entity 106, CU-U entity 107, and the DU 108. Such references are not limiting, however. One or more of the operations, methods and/or techniques may be performed by one or more other entities, in some embodiments. In a non-limiting example, an operation, method and/or technique described herein as performed by the CU-C entity 106 may be performed by a gNB-CU control plane (gNB-CU-CP) entity, in some embodiments. In another non-limiting example, an operation, method and/or technique described herein as performed by the CU-U entity 107 may be performed by a gNB-CU user plane (gNB-CU-UP) entity, in some embodiments. In another non-limiting example, an operation, method and/or technique described herein as performed by the DU 108 may be performed by a gNB distributed unit (gNB-DU) entity, in some embodiments.

In accordance with some embodiments, a Next Generation Node B (gNB) may be configured with logical nodes, including a gNB central unit (gNB-CU) and a gNB distributed unit (gNB-DU). The gNB-CU may comprise a gNB-CU control plane (gNB-CU-CP) for control-plane functionality, and a gNB-CU user plane (gNB-CU-UP) for user-plane functionality. The gNB-CU-CP may be configured to communicate with the gNB-CU-UP over an E1 interface. The gNB-CU-UP may be configured to communicate user plane messages with the gNB-DU over an F1 user-plane interface (F1-U). The gNB-CU-CP may be configured to communicate control plane messages with the gNB-DU over an F1 control plane interface (F1-C). An apparatus of the gNB may comprise memory and processing circuitry. The processing circuitry may be configured to initiate an E1 interface setup procedure to establish the E1 interface by sending a GNB-CU-UP E1 setup request message from the gNB-CU-UP to the gNB-CU-CP. The processing circuitry may be further configured to initiate a bearer context setup procedure to establish a bearer context in the gNB-CU-UP by sending a bearer context setup request message from the gNB-CU-CP to the gNB-CU-UP over the E1 interface. The processing circuitry may be further configured to initiate a UE context setup procedure to establish UE context by sending a UE context setup request message from the gNB-CU-CP to the gNB-DU over the F1-C, the UE context including a signaling radio bearer (SRB) configuration and a data radio bearer (DRB) configuration. The processing circuitry may be further configured to transfer an initial radio-resource control (RRC) message as an uplink (UL) PDCP-PDU from the gNB-DU to the gNB-CU-CP over the F1-C. The UE context setup request message may be configured to include quality-of-service parameters for the DRB configuration. The memory may be configured to store the DRB configuration. These embodiments are described in more detail below.

Figure 6:
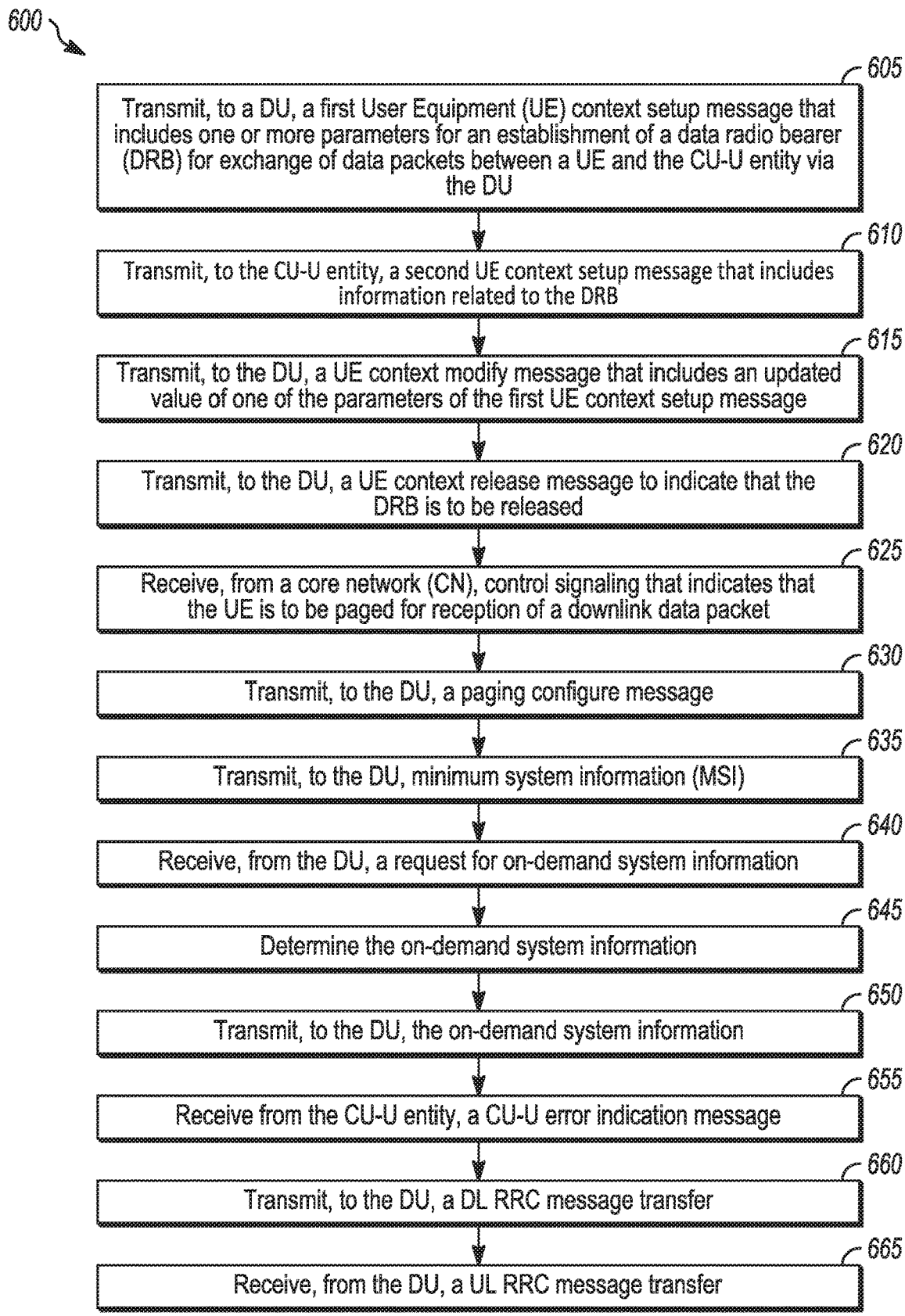
FIG. 6 illustrates the operation of a method of communication in accordance with some embodiments.

FIG. 6 illustrates the operation of a method of communication in accordance with some embodiments. It is important to note that embodiments of the method 600 may include additional or even fewer operations or processes in comparison to what is illustrated in FIG. 6. In some embodiments, the method 600 may include one or more operations not shown in FIG. 6, including but not limited to one or more operations shown in one or more of FIGS. 11-13.

In addition, embodiments of the method 600 are not necessarily limited to the chronological order that is shown in FIG. 6. In describing the method 600, reference may be made to one or more of FIGS. 1A, 1B, 2-5 and 7-12, although it is understood that the method 600 may be practiced with any other suitable systems, interfaces and components.

In some embodiments, a CU-C entity 106 may perform one or more operations of the method 600, but embodiments are not limited to performance of the method 600 and/or operations of it by the CU-C entity 106. In some embodiments, a gNB 105, an eNB 104 configured to operate as a gNB 105, an eNB 104, a UE 102 and/or other component may perform one or more operations of the method 600 (and/or similar operations). In some embodiments, a gNB 105, an eNB 104 configured to operate as a gNB 105, an eNB 104, a UE 102 and/or other component may perform one or more operations that may be reciprocal to one or more operations of the method 600.

In some embodiments, the CU-C entity 106, CU-U entity 107, DU 108 and/or gNB 105 may be arranged to operate in accordance with a New Radio (NR) standard and/or protocol, although the scope of embodiments is not limited in this respect. While the method 600 and other methods described herein may refer to CU-C entities 106, CU-U entities 107, DUs 108, eNBs 104, gNBs 105 and/or UEs 102 operating in accordance with 3GPP standards, 5G standards, NR standards and/or other standards, embodiments of those methods are not limited to just those devices, and may also be practiced on other devices, such as a Wi-Fi access point (AP) or user station (STA). In addition, the method 600 and other methods described herein may be practiced by wireless devices configured to operate in other suitable types of wireless communication systems, including systems configured to operate according to various IEEE standards such as IEEE 802.11. The method 600 and/or other methods described herein may also be applicable to an apparatus of a CU-C entity 106, an apparatus of a CU-U entity 107, an apparatus of a DU 108 and/or an apparatus of a gNB 105 and/or an apparatus of another device described above.

It should also be noted that embodiments are not limited by references herein (such as in descriptions of the methods 600, 700 and 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

In some embodiments, the CU-C entity 106, CU-U entity 107, DU 108 and/or gNB 105 may be arranged to operate in accordance with a New Radio (NR) protocol and/or standard, although the scope of embodiments is not limited in this respect.

In some embodiments, the CU-C entity 106 may be included in a disaggregated Next Generation Node-B (gNB) 105 that comprises a central unit (CU) and a distributed unit (DU) 108. The CU may comprise the CU-C entity 106 for control-plane functionality and the CU-U entity 107 for user-plane functionality.

In some embodiments, the CU-C entity 106 may be configurable for operation in which the CU-C entity 106 and the CU-U entity 107 are not co-located. In some embodiments, the CU-C entity 106 may be configurable for operation in which the CU-C entity 106 and the DU 108 are not co-located. Other arrangements are possible, including arrangements in which two or more of the CU-U entity 107, the CU-C entity 106 and the DU 108 are co-located.

At operation 605, the CU-C entity 106 may transmit, to a DU 108, a UE context setup message that includes one or more parameters for an establishment of a data radio bearer (DRB). The UE context setup message may be included in a 3GPP standard, NR standard and/or other standard, although the scope of embodiments is not limited in this respect. Embodiments are not limited to usage of the UE context setup message in operation 605, as any suitable message may be used.

In some embodiments, one or more messages exchanged between the CU-C entity 106 and the DU 108 (including but not limited to the message of operation 605) may be transmitted on an F1 interface, although the scope of embodiments is not limited in this respect.

In some embodiments, the DRB may be established for exchange of data packets between a UE 102 and the CU-U entity 107 via the DU 108, although the scope of embodiments is not limited in this respect.

In some embodiments, the parameters of the UE context setup message of operation 605 may be related to one or more of: a physical (PHY) layer of the DU 108, a medium access control (MAC) layer of the DU 108, a radio link control (RLC) layer of the DU 108 and/or other layer. In a non-limiting example, the parameters may include one or more of: an aggregate maximum bit rate (AMBR) for the UE, a quality of service (QoS) parameter, a latency, a bit error rate, a packet error rate and/or other.

At operation 610, the CU-C entity 106 may transmit, to the CU-U entity 107, a UE context setup message that includes information related to the DRB. The UE context setup message may be included in a 3GPP standard, NR standard and/or other standard, although the scope of embodiments is not limited in this respect. Embodiments are not limited to usage of the UE context setup message in operation 610, as any suitable message may be used.

In some embodiments, one or more messages exchanged between the CU-C entity 106 and the CU-U entity 107 (including but not limited to the message of operation 610) may be transmitted on an E1 interface, although the scope of embodiments is not limited in this respect.

In a non-limiting example, the UE context setup message of operation 610 may include an access stratum (AS) security key for encryption and decryption of the data packets of the DRB. Additional information and/or alternate information may be included in the message of operation 610, in some embodiments.

In some embodiments, the UE context setup message of operation 610 and the UE context setup message of operation 605 may be different messages, although the scope of embodiments is not limited in this respect.

At operation 615, the CU-C entity 106 may transmit, to the DU 108, a UE context modify message. The UE context modify message may be included in a 3GPP standard, NR standard and/or other standard, although the scope of embodiments is not limited in this respect. Embodiments are not limited to usage of the UE context modify message in operation 615, as any suitable message may be used.

In some embodiments, the UE context modify message may include one or more updated values of one of the parameters of the UE context setup message of operation 605. Additional information and/or alternate information may be included, in some embodiments.

At operation 620, the CU-C entity 106 may transmit, to the DU 108, a UE context release message to indicate that the DRB is to be released. The UE context release message may be included in a 3GPP standard. NR standard and/or other standard, although the scope of embodiments is not limited in this respect. Embodiments are not limited to usage of the UE context release message in operation 620, as any suitable message may be used.

At operation 625, the CU-C entity 106 may receive, from a core network (CN), control signaling that indicates that the UE 102 is to be paged. In some embodiments, the CU-C entity 106 may receive the control signaling from a component of the CN (such as the MME 122, SGW 124 and/or other component), although the scope of embodiments is not limited in this respect.

In some embodiments, the control signaling may indicate that the UE 102 is to be paged for reception of one or more downlink data packets, although the scope of embodiments is not limited in this respect. For instance, the UE 102 may be paged for other purposes, in some cases.

In some embodiments, the control signaling may include information related to one or more of: a paging identifier of the UE 102, paging identifiers of a group of UEs 102 (which may include the UE 102), a paging occasion and/or other information.

At operation 630, the CU-C entity 106 may transmit, to the DU 108, a paging configure message. The paging configure message may be included in a 3GPP standard, NR standard and/or other standard, although the scope of embodiments is not limited in this respect. Embodiments are not limited to usage of the paging configure message in operation 630, as any suitable message may be used.

In some embodiments, the paging configure message may indicate one or more of: a paging identity of the UE 102, a paging occasion in which the UE 102 is to be paged and/or other information.

At operation 635, the CU-C entity 106 may transmit, to the DU 108, minimum system information (MSI). In some embodiments, the CU-C entity 106 may determine the MSI, although the scope of embodiments is not limited in this respect.

In some embodiments, the CU-C entity 106 may transmit the MSI to the DU 108 for broadcast by the DU 108, although the scope of embodiments is not limited in this respect. In some embodiments, the MSI may include a master information block (MIB) and a type 1 SI block (SIB-1). In some embodiments, the MSI may include one or more of: an MIB, an SIB-1 and/or other.

At operation 640, the CU-C entity 106 may receive, from the DU 108, a request for on-demand system information. At operation 645, the CU-C entity 106 may determine the on-demand system information. At operation 650, the CU-C entity 106 may transmit, to the DU 108, the on-demand system information.

In some embodiments, the CU-C entity 106 may receive the request from the DU 108, wherein the DU 108 operates as a relay for the UE 102. In some embodiments, the CU-C entity 106 may receive the request from the DU 108 on behalf of the UE 102.

In a non-limiting example, the on-demand system information may be related to a capability of the UE 102 to camp on a cell that includes the disaggregated gNB 105. Additional information and/or alternate information may be included in the on-demand system information, in some embodiments. In some embodiments, the on-demand system information may be specific to the UE 102, although the scope of embodiments is not limited in this respect.

In some embodiments, the CU-C entity 106 may transmit the on-demand system information to the DU 108 as part of a downlink RRC message transfer. In some embodiments, the CU-C entity 106 may transmit a downlink RRC message transfer that includes the on-demand system information. The downlink RRC message transfer may be included in a 3GPP standard, NR standard and/or other standard, although the scope of embodiments is not limited in this respect. Embodiments are not limited to usage of the downlink RRC message transfer in operation 650, as any suitable message may be used.

At operation 655, the CU-C entity 106 may receive, from the CU-U entity 107, a CU-U error indication message. The CU-U error indication message may be included in a 3GPP standard, NR standard and/or other standard, although the scope of embodiments is not limited in this respect. Embodiments are not limited to usage of the CU-U error indication message in operation 655, as any suitable message may be used.

At operation 660, the CU-C entity 106 may transmit, to the DU entity 108, a DL RRC message transfer message. In some embodiments, the message may be intended for the UE 102 and forwarded by the DU 108, although the scope of embodiments is not limited in this respect. The message may be used to configure, reconfigure or release RRC connection. The DL RRC message transfer message may be included in a 3GPP standard, NR standard and/or other standard, although the scope of embodiments is not limited in this respect. Embodiments are not limited to usage of the DL RRC message transfer message in operation 660, as any suitable message may be used.

At operation 665, the CU-C entity 106 may receive, from the DU entity 108, a UL RRC message transfer message, which may encapsulate the RRC message sent by the UE 102. The message may be used for one or more of: to report measurement results, to respond to an RRC connection request and/or other operation(s). The UL RRC message transfer message may be included in a 3GPP standard, NR standard and/or other standard, although the scope of embodiments is not limited in this respect. Embodiments are not limited to usage of the UL RRC message transfer message in operation 665, as any suitable message may be used.

In some embodiments, the CU-U error indication message may indicate one or more of: a packet data convergence protocol (PDCP) outage of the DRB, a hardware failure, an unavailability of a transport resource and/or other information. Additional information and/or alternate information may be included, in some embodiments.

One or more of the messages described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of those particular messages, however. Embodiments are not limited to the names of the messages described herein. The scope of embodiments is also not limited to usage of elements that are included in standards.

In some embodiments, a CU-C entity 106 may comprise memory. The memory may be configurable to store information that identifies the AS security key. The memory may store one or more other elements and the apparatus may use them for performance of one or more operations. The CU-C entity 106 may include processing circuitry, which may perform one or more operations (including but not limited to operation(s) of the method 600 and/or other methods described herein). The processing circuitry may include a baseband processor. The baseband circuitry and/or the processing circuitry may perform one or more operations described herein, including but not limited to encoding of one or more UE context setup messages. The CU-C entity 106 may include a transceiver to transmit one or more UE context setup messages. The transceiver may transmit and/or receive other blocks, messages and/or other elements.

Figure 7:
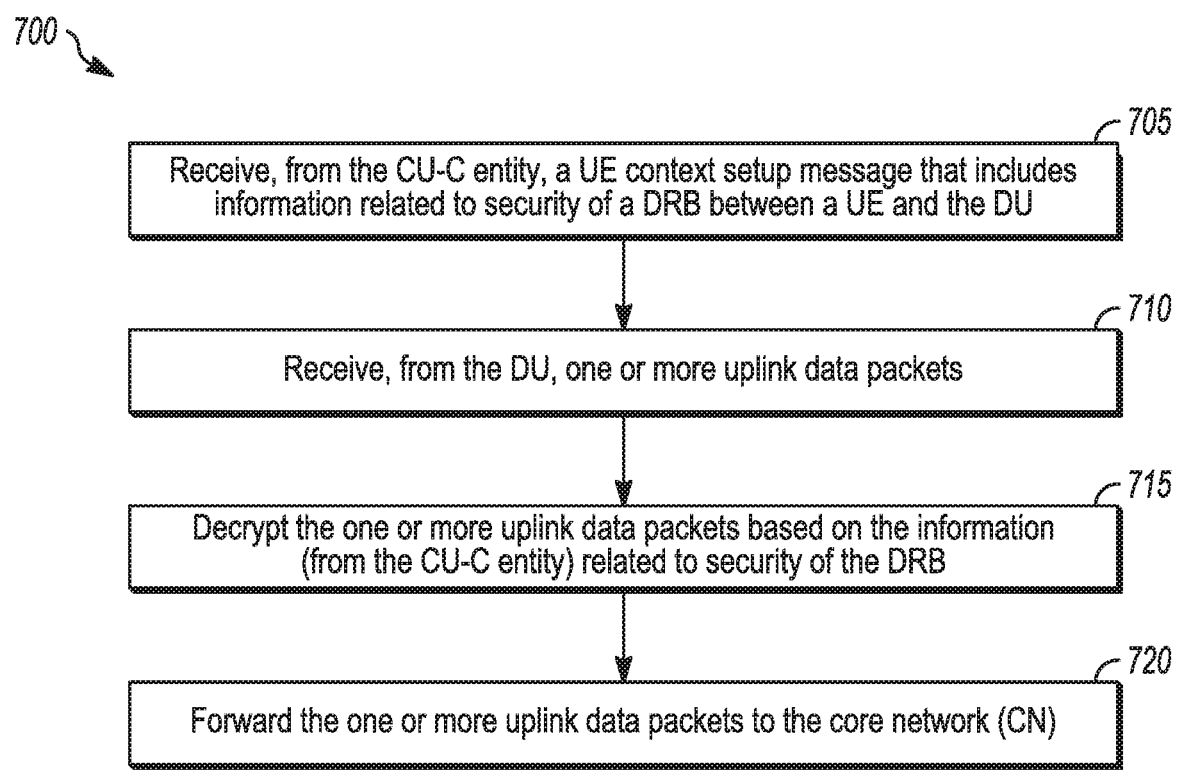
FIG. 7 illustrates the operation of another method of communication in accordance with some embodiments.
Figure 8:
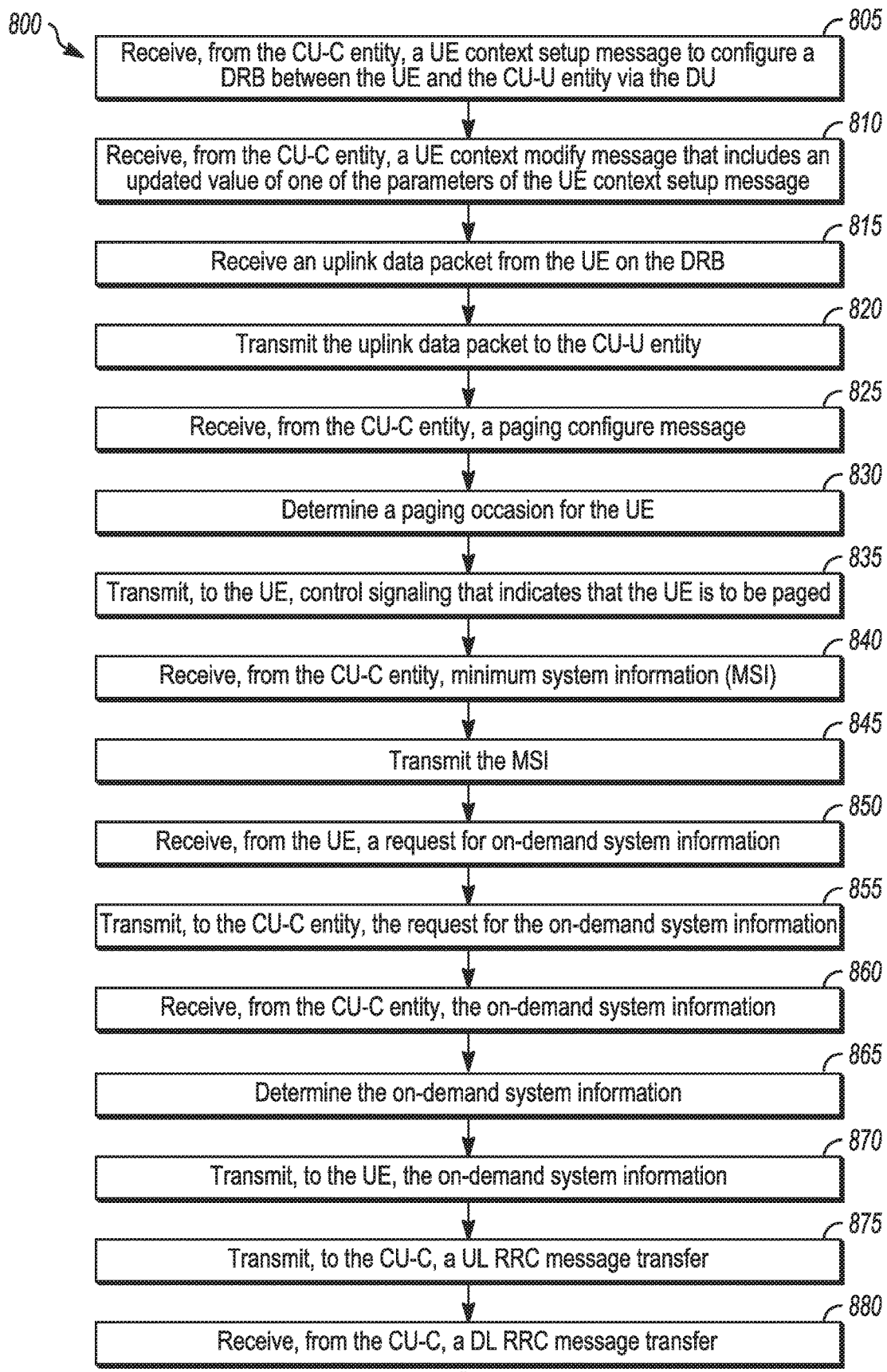
FIG. 8 illustrates the operation of another method of communication in accordance with some embodiments.

FIG. 7 illustrates the operation of another method of communication in accordance with some embodiments. FIG. 8 illustrates the operation of another method of communication in accordance with some embodiments. Embodiments of the methods 700 and 800 may include additional or even fewer operations or processes in comparison to what is illustrated in FIGS. 7-8 and embodiments of the methods 700 and/or 800 are not necessarily limited to the chronological order that is shown in FIGS. 7-8. In some embodiments, the method 700 may include one or more operations not shown in FIG. 7, including but not limited to one or more operations shown in one or more of FIGS. 11-13. In some embodiments, the method 800 may include one or more operations not shown in FIG. 8, including but not limited to one or more operations shown in one or more of FIGS. 11-13.

In describing the methods 700 and/or 800, reference may be made to one or more of the figures described herein, although it is understood that the methods 700 and/or 800 may be practiced with any other suitable systems, interfaces and components. In addition, embodiments of the methods 700 and/or 800 may be applicable to UEs 102, eNBs 104, gNBs 105, CU-C entities 106, CU-U entities 107. DUs 108, APs, STAs and/or other wireless or mobile devices. The methods 700 and/or 800 may also be applicable to an apparatus of a UE 102, eNB 104, gNB 105, CU-C entity 106, CU-U entity 107, DU 108 and/or other device described above.

In some embodiments, a CU-U 107 entity may perform one or more operations of the method 700, but embodiments are not limited to performance of the method 700 and/or operations of it by the CU-U entity 107. In some embodiments, another component (such as the CU-C entity 106, DU 108, gNB 105, eNB 104 and/or other) may perform one or more operations of the method 700 (and/or similar operations). In some embodiments, another component (such as the CU-C entity 106, DU 108, gNB 105, eNB 104 and/or other) may perform one or more operations that may be reciprocal to one or more operations of the method 700.

In some embodiments, a DU 108 may perform one or more operations of the method 800, but embodiments are not limited to performance of the method 800 and/or operations of it by the DU 108. In some embodiments, another component (such as the CU-C entity 106, CU-U entity 107, gNB 105, eNB 104 and/or other) may perform one or more operations of the method 800 (and/or similar operations). In some embodiments, another component (such as the CU-C entity 106, CU-U entity 107, gNB 105, eNB 104 and/or other) may perform one or more operations that may be reciprocal to one or more operations of the method 800.

It should be noted that one or more operations of one of the methods 600, 700, 800 may be the same as, similar to and/or reciprocal to one or more operations of the other methods. For instance, an operation of the method 600 may be the same as, similar to and/or reciprocal to an operation of the method 700, in some embodiments. In a non-limiting example, an operation of the method 600 may include transmission of an element (such as a frame, block, message and/or other) from the CU-C entity 106 to the CU-U entity 107, and an operation of the method 700 may include reception of a same element (and/or similar element) from the CU-C entity 106 by the CU-U entity 107. In some cases, descriptions of operations and techniques described as part of one of the methods 600, 700, 800 may be relevant to one or both of the other methods.

In addition, previous discussion of various techniques and concepts may be applicable to the methods 700 and/or 800 in some cases, including but not limited to disaggregated gNB 105, F1 interface, F1-C interface, F1-U interface, E1 interface, paging, on-demand SI, MSI, messages (including but not limited to messages described regarding the method 600) and/or other. In addition, the examples shown in one or more of the figures may also be applicable, in some cases, although the scope of embodiments is not limited in this respect.

At operation 705, the CU-U entity 107 may receive, from the CU-C entity 106, a UE context setup message. The UE context setup message may be included in a 3GPP standard, NR standard and/or other standard, although the scope of embodiments is not limited in this respect. Embodiments are not limited to usage of the UE context setup message in operation 705, as any suitable message may be used.

In some embodiments, the UE context setup message may include information related to security of a DRB. In a non-limiting example, an AS security key may be included in the UE context setup message.

In some embodiments, the DRB may be at least party for communication between the UE 102 and the DU 108, although the scope of embodiments is not limited in this respect. In some embodiments, the CU-U 107 may operate as a relay between the DU 108 and a core network (CN) for the DRB. In some embodiments, the CU-U 107 may operate as a relay between the DU 108 and one or more components of the CN for the DRB.

At operation 710, the CU-U entity 107 may receive, from the DU 108, one or more uplink data packets. In some embodiments, the CU-U entity 107 may receive the one or more uplink data packets from the DU 108 on the DRB.

At operation 715, the CU-U entity 107 may decrypt the one or more uplink data packets based at least partly on the information (received from the CU-C entity 106 at operation 705) related to security of the DRB. In some embodiments, the CU-U entity 107 may decrypt the one or more uplink data packets based at least partly on an AS security key included in the UE context setup message of operation 705.

At operation 720, the CU-U entity 107 may forward the one or more uplink data packets to the core network (CN). In some embodiments, the CU-U entity 107 may forward the one or more uplink data packets to one or more components of the CN. In a non-limiting example, the CU-U entity 107 may forward the one or more uplink data packets to the SGW 124.

In some embodiments, the CU-U entity 107 may forward decrypted uplink data packet(s) to the CN, although the scope of embodiments is not limited in this respect. For instance, some embodiments may not necessarily include operation 715.

In some embodiments, the CU-U entity 107 may be configurable for operation in which the CU-U entity 107 and the CU-C entity 106 are not co-located. In some embodiments, the CU-U entity 107 may be configurable for operation in which the CU-U entity 107 and the DU 108 are not co-located. Other arrangements are possible, including arrangements in which two or more of the CU-U entity 107, the CU-C entity 106 and the DU 108 are co-located.

In some embodiments, a CU-U entity 107 may comprise memory. The memory may be configurable to store information that identifies the AS security key. The memory may store one or more other elements and the apparatus may use them for performance of one or more operations. The CU-U entity 107 may include processing circuitry, which may perform one or more operations (including but not limited to operation(s) of the method 700 and/or other methods described herein). The processing circuitry may include a baseband processor. The baseband circuitry and/or the processing circuitry may perform one or more operations described herein, including but not limited to decoding of one or more UE context setup messages. The CU-U entity 107 may include a transceiver to receive one or more UE context setup messages. The transceiver may transmit and/or receive other blocks, messages and/or other elements.

At operation 805, the DU 108 may receive, from the CU-C entity 106, a UE context setup message. The UE context setup message may be included in a 3GPP standard, NR standard and/or other standard, although the scope of embodiments is not limited in this respect. Embodiments are not limited to usage of the UE context setup message in operation 805, as any suitable message may be used.

In some embodiments, the UE context setup message may configure a DRB between the UE 102 and the CU-U entity 106 via the DU 108. In some embodiments, the UE context setup message may be used to configure a DRB between the UE 102 and the CU-U entity 106 via the DU 108. In some embodiments, the UE context setup message may include information related to a DRB between the UE 102 and the CU-U entity 106 via the DU 108.

In a non-limiting example, the UE context setup message may include one or more of: an aggregate maximum bit rate (AMBR) for the UE 102, a quality of service (QoS) parameter, a latency, a bit error rate, a packet error rate and/or other.

At operation 810, the DU 108 may receive, from the CU-C entity 106, a UE context modify message that includes an updated value of one of the parameters of the UE context setup message. The UE context modify message may be included in a 3GPP standard, NR standard and/or other standard, although the scope of embodiments is not limited in this respect. Embodiments are not limited to usage of the UE context modify message in operation 810, as any suitable message may be used.

At operation 815, the DU 108 may receive an uplink data packet from the UE 102. In some embodiments, the DU 108 may receive the uplink data packet from the UE 102 on the DRB, although the scope of embodiments is not limited in this respect.

At operation 820, the DU 108 may transmit the uplink data packet to the CU-U entity 107. In some embodiments, the DU 108 may forward the uplink data packet to the CU-U entity 107.

In some embodiments, the DU 108 may perform one or more operations similar to operations 815-820 for the downlink. For instance, the DU 108 may receive a downlink data packet from CU-U that is intended for the UE 102. The DU 108 may transmit and/or forward the downlink data packet to the UE 102.

At operation 825, the DU 108 may receive, from the CU-C entity 106, a paging configure message. The paging configure message may be included in a 3GPP standard, NR standard and/or other standard, although the scope of embodiments is not limited in this respect. Embodiments are not limited to usage of the paging configure message in operation 825, as any suitable message may be used.

In some embodiments, the paging configure message may indicate that the UE 102 is to be paged for reception of one or more downlink data packets, although the scope of embodiments is not limited in this respect. For instance, the UE 102 may be paged for other purposes, in some cases.

In some embodiments, the paging configure message may include information related to one or more of: a paging identifier of the UE 102, paging identifiers of a group of UEs 102 (which may include the UE 102), a paging occasion and/or other information.

At operation 830, the DU 108 may determine a paging occasion for the UE 102. It should be noted that some embodiments may not necessarily include operation 830. For instance, the paging occasion may be indicated in the paging configure message, in some embodiments.

At operation 835, the DU 108 may transmit, to the UE 102, control signaling that indicates that the UE 102 is to be paged.

In some embodiments, if the CU-C entity 106 and the DU 108 are synchronized, the DU 108 may transmit the control signaling in a paging occasion indicated by the paging configure message.

In some embodiments, if the CU-C entity 106 and the DU 108 are not synchronized, the DU 108 may determine a paging occasion for the UE 102 based on information included in the paging configure message. Such information may be related to one or more of: a paging identity of the UE 102, a paging group of the UE 102 and/or other. The DU 108 may transmit the control signaling to the UE 102 in the determined paging occasion.

At operation 840, the DU 108 may receive, from the CU-C entity 106, minimum system information (MSI). At operation 845, the DU 108 may transmit the MSI. In some embodiments, the DU 108 may transmit the MSI in accordance with a broadcast transmission, although the scope of embodiments is not limited in this respect.

At operation 850, the DU 108 may receive, from the UE 102, a request for on-demand system information. In a non-limiting example, the on-demand system information may be related to a capability of the UE 102 to camp on a cell that includes the disaggregated gNB 105. Additional information and/or alternate information may be included in the on-demand system information, in some embodiments. In some embodiments, the on-demand system information may be specific to the UE 102, although the scope of embodiments is not limited in this respect.

In a non-limiting example, the request from the UE 102 for the on-demand SI is included in a type-1 message (msg-1) of a random access procedure or a type-3 message (msg-3) of the random access procedure. These messages (msg-1, msg-3) may be included in a 3GPP standard, NR standard and/or other standard, although the scope of embodiments is not limited in this respect. Embodiments are not limited to usage of these messages (msg-1, msg-3) in operation 850, as any suitable message may be used.

At operation 855, the DU 108 may transmit, to the CU-C entity 106, the request for on-demand system information. In some embodiments, the DU 108 may transmit the request to the CU-C entity 106 as part of an uplink RRC message transfer. In some embodiments, the DU 108 may transmit an uplink RRC message transfer that includes the request. The uplink RRC message transfer may be included in a 3GPP standard, NR standard and/or other standard, although the scope of embodiments is not limited in this respect. Embodiments are not limited to usage of the uplink RRC message transfer in operation 855, as any suitable message may be used.

At operation 860, the DU 108 may receive, from the CU-C entity 106, the on-demand system information. In some embodiments, the DU 108 may receive the on-demand system information from the CU-C entity 106 as part of a downlink RRC message transfer. In some embodiments, the DU 108 may receive a downlink RRC message transfer that includes the on-demand system information. The downlink RRC message transfer may be included in a 3GPP standard, NR standard and/or other standard, although the scope of embodiments is not limited in this respect. Embodiments are not limited to usage of the downlink RRC message transfer in operation 860, as any suitable message may be used.

At operation 865, the DU 108 may determine the on-demand system information.

In some embodiments, one or both of operations 855-860 may not necessarily be included. For instance, the DU 108 may determine the on-demand information (at operation 865), and may not necessarily send the request to the CU-C entity 106.

In some embodiments, operation 865 may not necessarily be included. For instance, the DU 108 may obtain the on-demand system information from the CU-C entity 106 at operation 860 instead of determination of the on-demand system information.

In some embodiments, a first portion of the on-demand system information may be determined by the DU 108 and a second portion of the on-demand system information may be received from the CU-C entity 106.

At operation 870, the DU 108 may transmit, to the UE 102, the on-demand system information.

At operation 875, the DU 108 may transmit to the CU-C entity 106, a UL RRC message transfer message. The message may be received from the UE 102. The message may be used for one or more of: to report measurement results, to respond to an RRC connection request and/or other operation(s).

At operation 880, the DU 108 may receive from the CU-C 106, a DL RRC message transfer message. The message may be intended for the UE 102, although the scope of embodiments is not limited in this respect. The message may be used for one or more of: configuring an RRC connection, reconfiguring the RRC connection, releasing the RRC connection and/or other operation(s).

In some embodiments, the DU 108 may be configurable for operation in which the DU and the CU-U entity 107 are not co-located. In some embodiments, the DU 108 may be configurable for operation in which the CU-C entity 106 and the DU 108 are not co-located. Other arrangements are possible, including arrangements in which two or more of the CU-U entity 107, the CU-C entity 106 and the DU 108 are co-located.

In some embodiments, a DU 108 may comprise memory. The memory may be configurable to store information related to a received UE context setup message. The memory may store one or more other elements and the apparatus may use them for performance of one or more operations. The DU 108 may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding of one or more UE context setup messages. The DU 108 may include a transceiver to receive one or more UE context setup messages. The transceiver may transmit and/or receive other blocks, messages and/or other elements.

Figure 9:
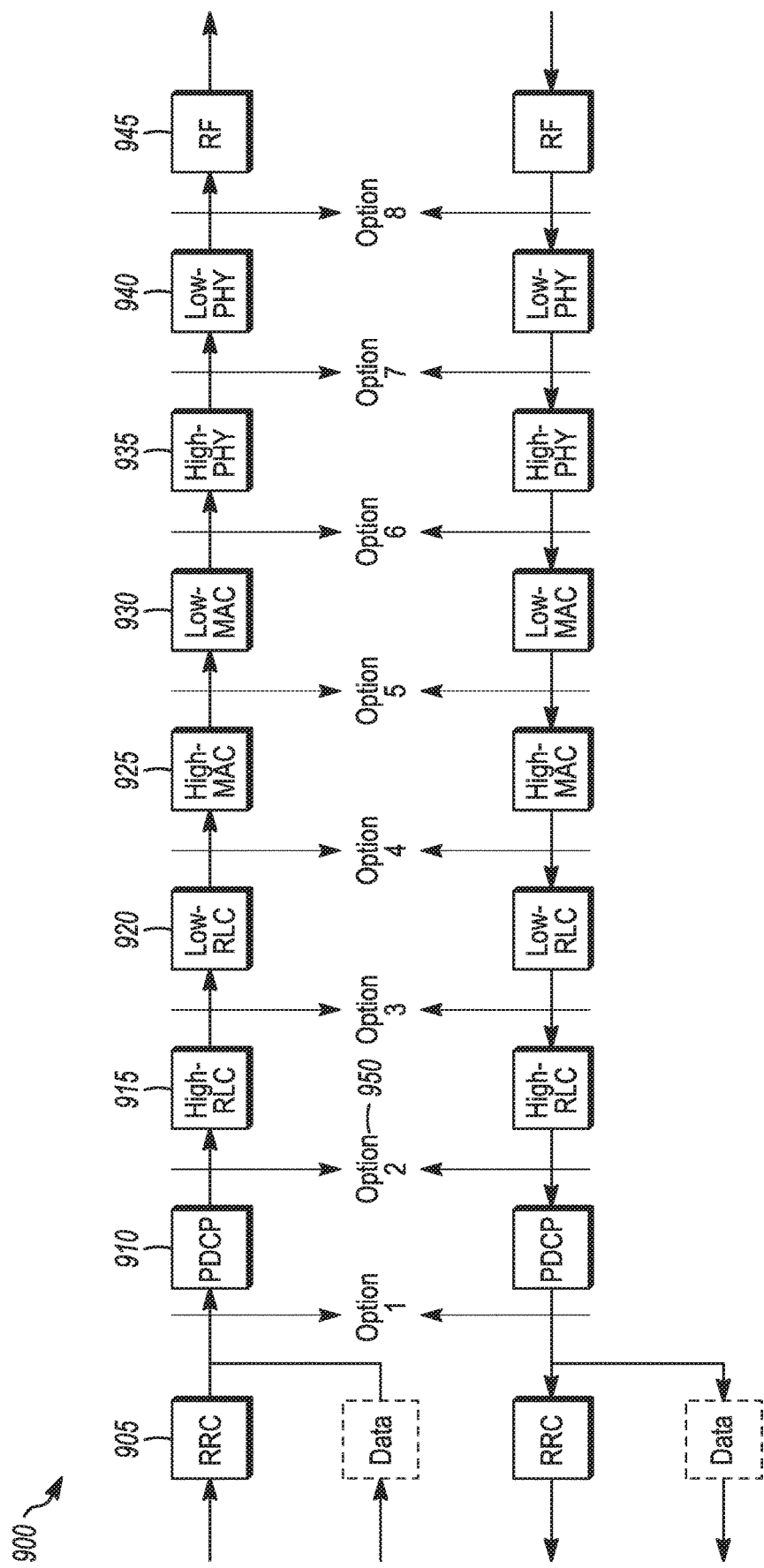
FIG. 9 illustrates examples of protocol layers and functional splits in accordance with some embodiments.
Figure 10:
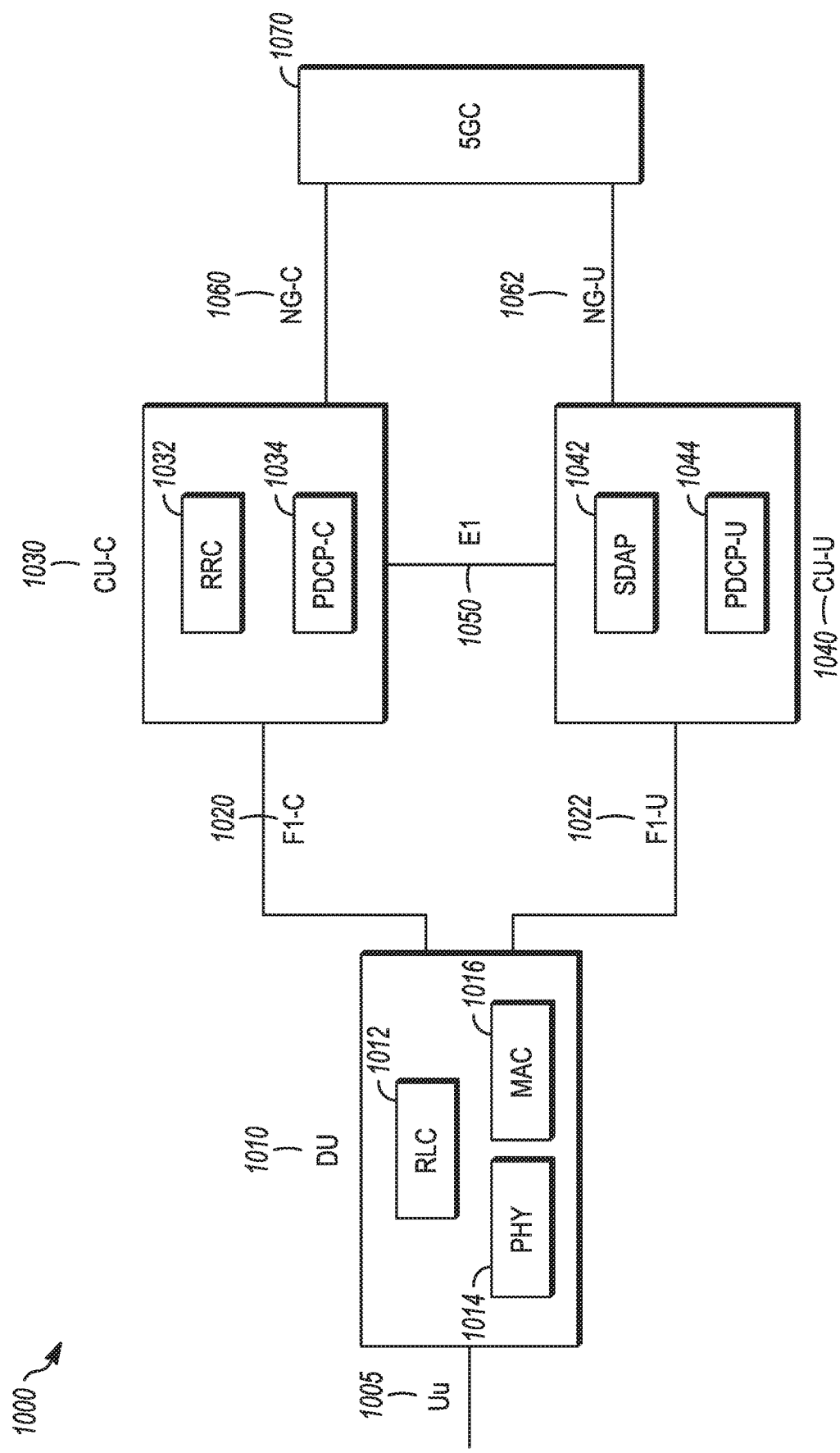
FIG. 10 illustrates an example architecture in accordance with some embodiments.
Figure 11A:
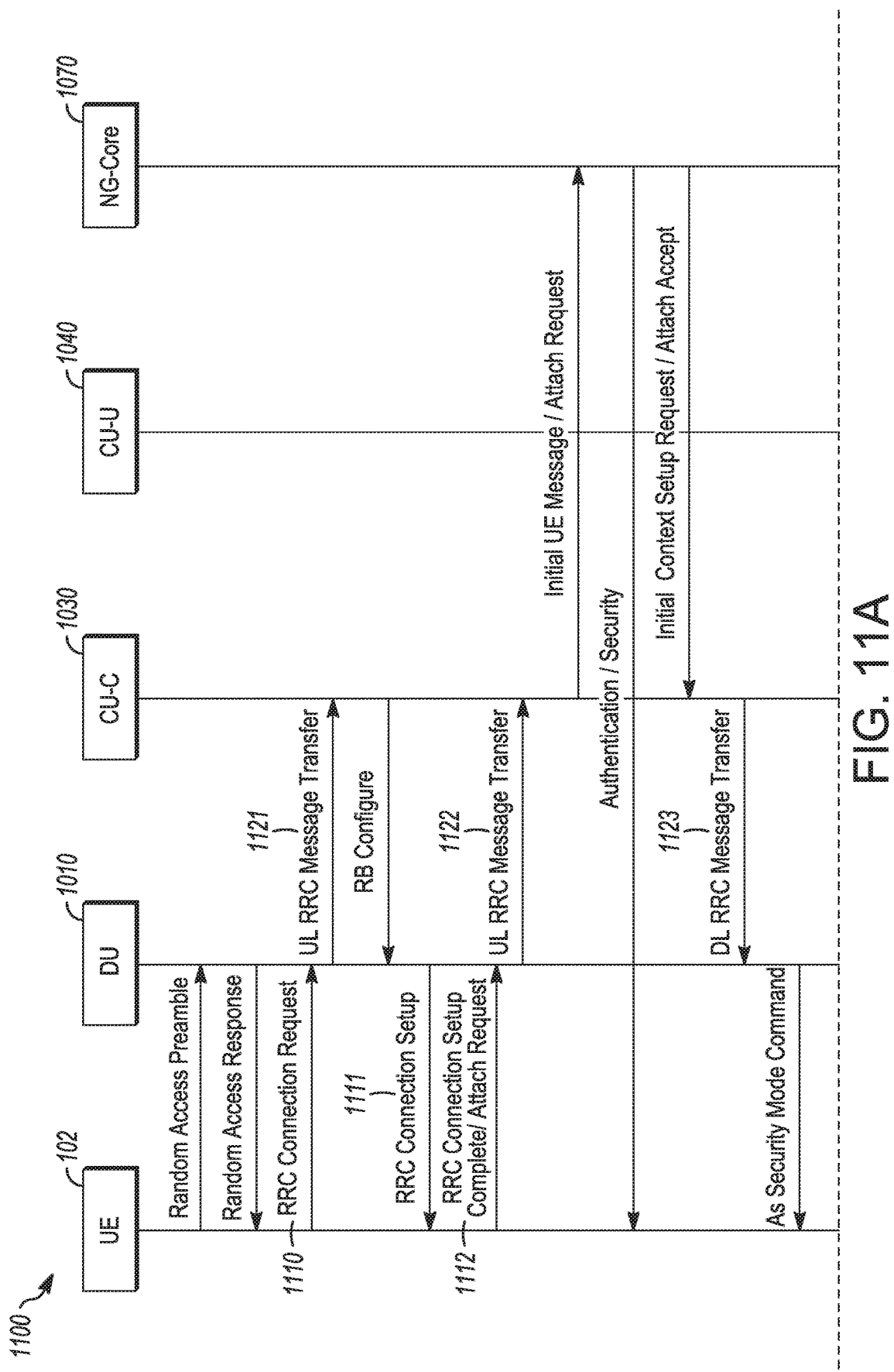
FIG. 11A and FIG. 11B illustrate example operations and example messages that may be exchanged in accordance with some embodiments.
Figure 11B:
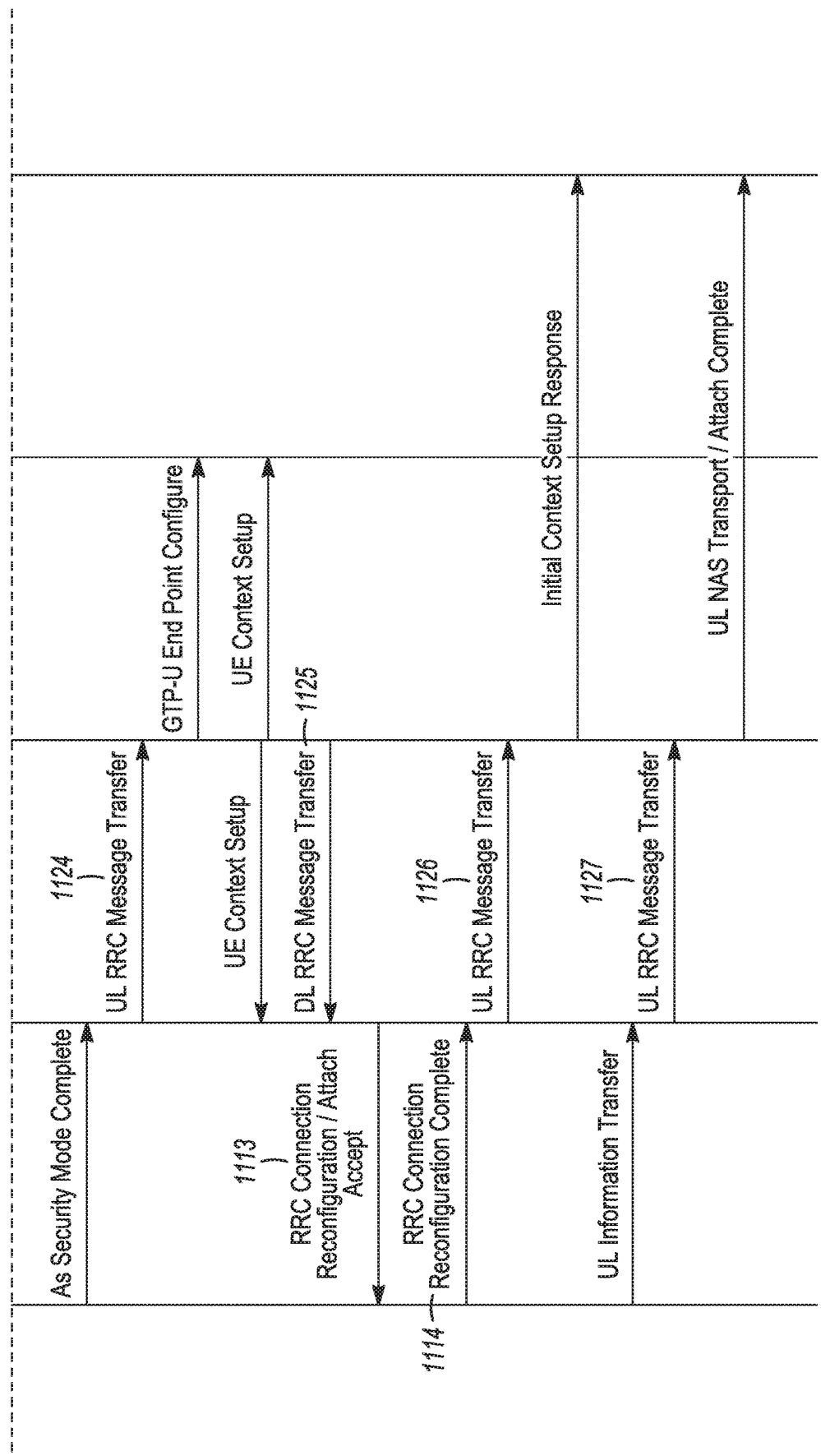
Figure 12:
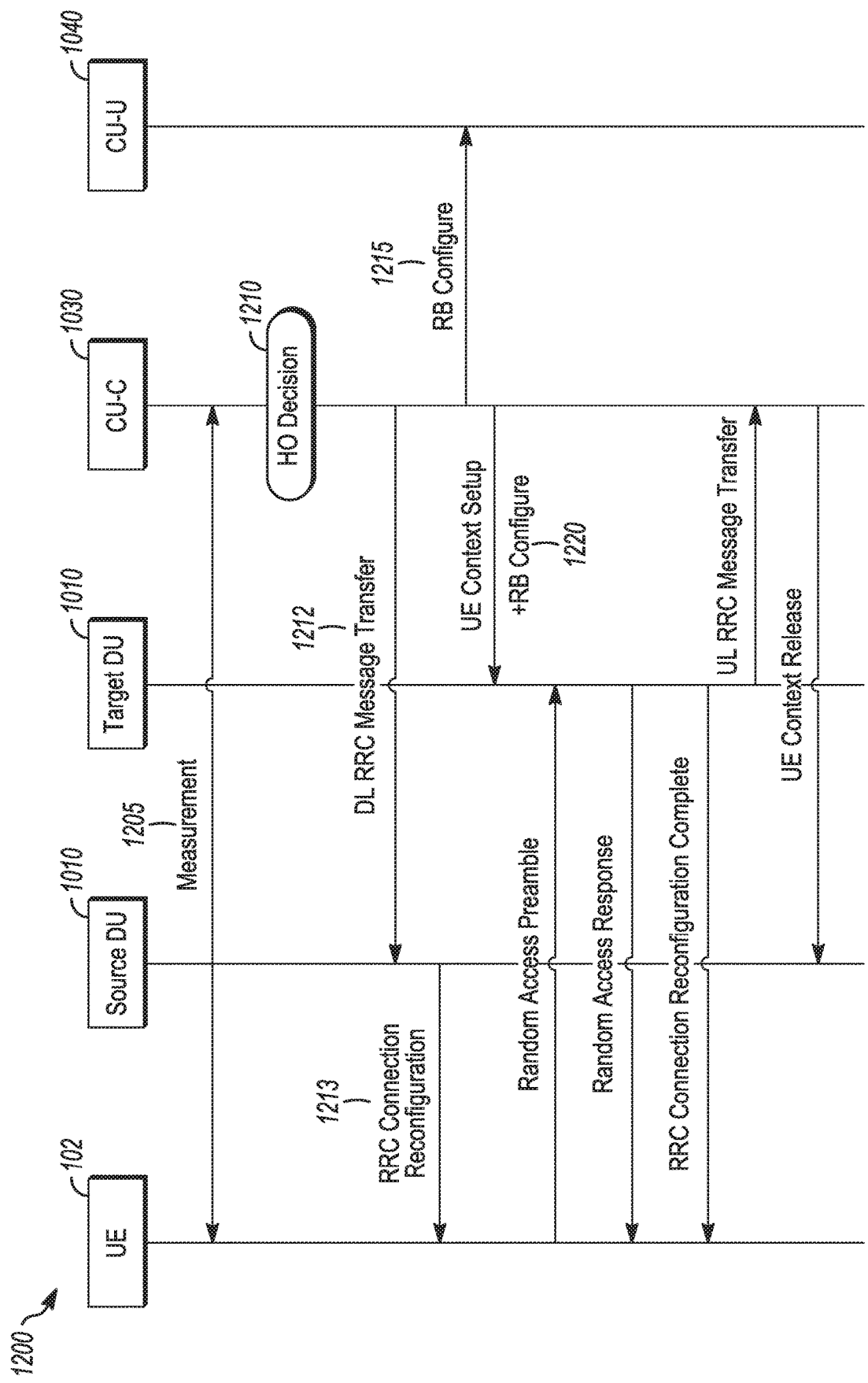
FIG. 12 illustrates additional example operations and additional example messages that may be exchanged in accordance with some embodiments.
Figure 13:
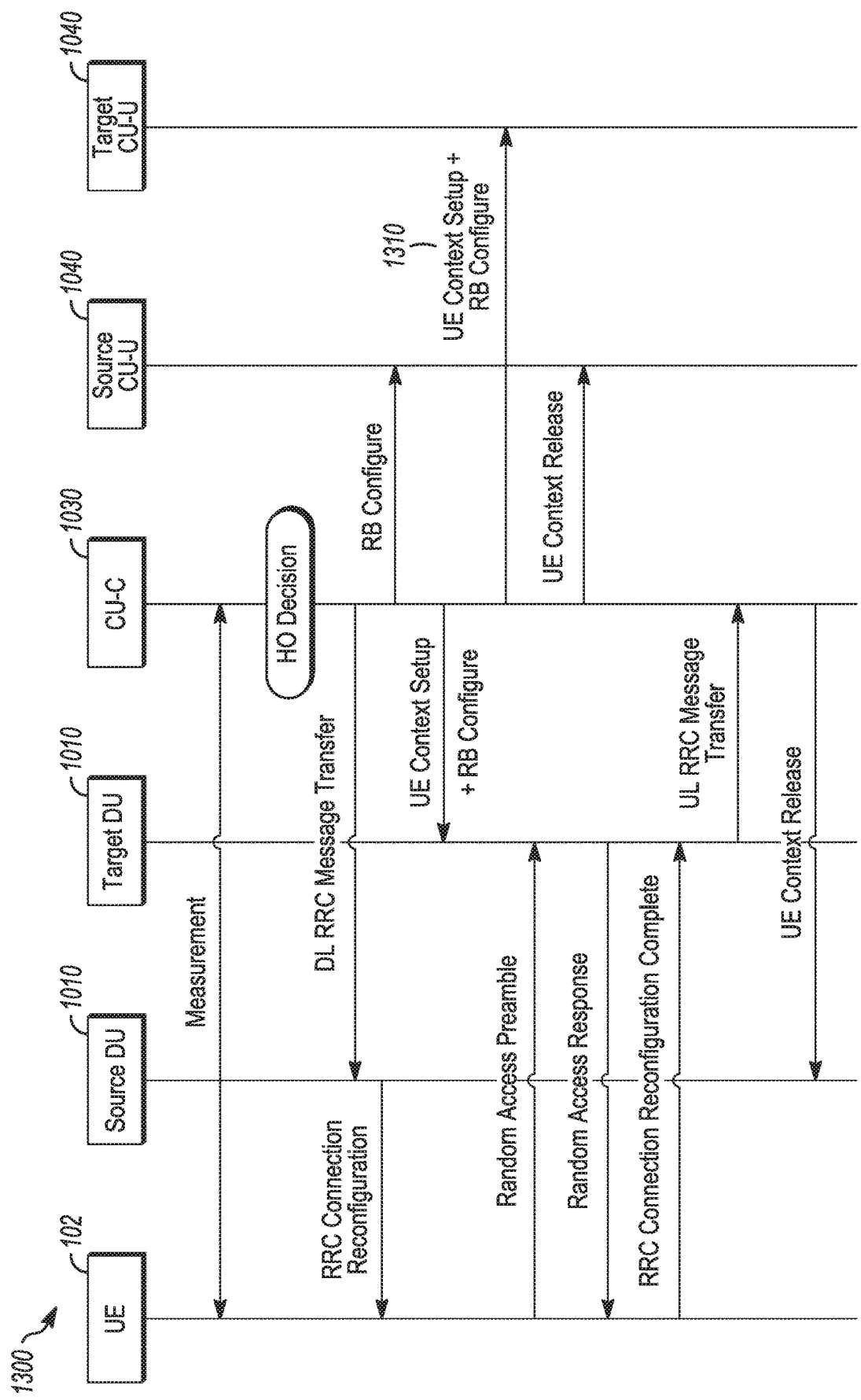
FIG. 13 illustrates additional example operations and additional example messages that may be exchanged in accordance with some embodiments.

FIG. 9 illustrates examples of protocol layers and functional splits in accordance with some embodiments. FIG. 10 illustrates an example architecture in accordance with some embodiments. FIG. 11A and FIG. 11B illustrate example operations and example messages that may be exchanged in accordance with some embodiments. In references herein. "FIG. 11" may include FIG. 11A and FIG. 11B. FIG. 12 illustrates additional example operations and additional example messages that may be exchanged in accordance with some embodiments. FIG. 13 illustrates additional example operations and additional example messages that may be exchanged in accordance with some embodiments. It should be noted that the examples shown in FIGS. 9-13 may illustrate some or all of the concepts and techniques described herein in some cases, but embodiments are not limited by the examples. For instance, embodiments are not limited by the name, number, type, size, ordering, arrangement and/or other aspects of the operations, messages, gNBs 105, UEs 102, CU-C entities 106, CU-U entities 107, DUs 108, and other elements as shown in FIGS. 9-13. Although some of the elements shown in the examples of FIGS. 9-13 may be included in a 3GPP LTE standard, 5G standard. NR standard and/or other standard, embodiments are not limited to usage of such elements that are included in standards.

Referring to FIG. 9, multiple elements 905-945 of a RAN architecture 900 are shown. Embodiments are not limited to the elements shown. In some embodiments, a RAN architecture may not necessarily include all elements shown in FIG. 9. In some embodiments, a RAN architecture may include one or more additional elements not shown in FIG. 9. In some embodiments, one or more of the elements 905-945 may be included in a 3GPP standard, NR standard, 5G standard and/or other standard, although the scope of embodiments is not limited in this respect. As shown in FIG. 9, different options (indicated by "option 1" through "option 8") are possible for a functional split within the RAN architecture 900 (for instance, a NR base station) between central and distributed units. For instance, as indicated by 1050, a functional split according to "option 2" is between the PDCP 910 and the high RLC 915. Some descriptions herein may refer to techniques that use the split according to option 2, but it is understood that embodiments are not limited to usage of the split according to option 2. Some or all techniques described herein may be applicable to embodiments in which another split (including but not limited to other options shown in FIG. 9) is used, in some cases.

Referring to FIG. 10, the RAN architecture 1000 includes C-plane/U-plane separation for CU. In some embodiments, NG-C and NG-U may be applicable to RAN3 arrangements. In some embodiments, SA2 arrangements may use N2 and N3 instead of NG-C and NG-U, respectively.

In some embodiments, a control plane (CP) of a Next Generation Node-B (gNB) 105 may use and/or include RRC 1032 and PDCP 1034 of the signaling radio bearer (SRB), which may be included into a control central unit (CU-C) 1030. In some embodiments, a user plane (UP) of the gNB 105 may include RLC 1012. MAC 1014 and PHY 1016, which may be deployed in the distributed unit (DU) 1010, while PDCP of the data radio bearer (DRB) (shown as PDCP-U 1044) and service data application protocol (SDAP) 1042 may be included in another CU (CU-U) 1040. The RAN 1000 may include one or more interfaces (including but not limited to 1020, 1022, 1050, 1060, 1062).

In some embodiments, the CU-C 1030 may perform one or more control functions and may support the PDCP of SRB (shown as PDCP-C 1034). In some embodiments, RRC 1032 and/or NGAP of one or more UEs 102 may be performed by the CU-C 1030. In some embodiments, functionality related to access/mobility management and performance optimization, including but not limited to RRM, may be implemented in a central manner in CU-C 1030. In some cases, the CU-C 1030 may have a global view of the network.

In some embodiments, the user-plane central unit (CU-U) 1040 may terminate GTP-U (such as the NG-U interface 1062) towards 5GC 1070. The CU-C 1030 may perform one or more operations related to SDAP. A non-limiting example of such an operation is mapping between QoS flows and DRBs. Such a mapping may be included in a 5G arrangement and/or NR arrangement, although the scope of embodiments is not limited in this respect. In some embodiments, the CU-C 1040 may perform one or more operations related to PDCP of DRB (indicated by PDCP-U 1044). In some embodiments, CU-U 1040 may perform one or more operations related to PDCP of SRB. In a non-limiting example, the CU-U 1040 may be configured by the CU-C 1030 to perform one or more operations related to PDCP of SRB.

In some embodiments, the distributed unit (DU) 1010 may perform one or more operations related to RLC 1012, PHY 1014 and/or MAC 1016.

In some embodiments, the 5GC may operate as a mobility anchor and/or gateway for different services.

In some embodiments, the E1 interface 1050 may perform one or more of: communicate messages between CU-C 1030 and CU-U 1040 (including but not limited to messages to set up UE context); configure GTP-U end points, SDAP 1042, and PDCP of DRB/SRB; transfer RRC messages; and/or other.

In some embodiments, the F1-C interface 1020 may perform one or more of: communicate messages between CU-C 1030 and DU 1010, including but not limited to messages to configure PHY 1014, MAC 1016 and RLC 1012; transfer PDCP PDU of RRC messages; and/or other.

In some embodiments, the F1-U interface 1022 may perform one or more of: transfer PDCP PDU of DRB/SRB between CU-U 1040 and the DU 1010.

In some embodiments, the NG-U interface 1062 (and/or N3 interface) may perform one or more of: transfer GTP-U between 5GC 1070 and CU-U 1040; and/or other. In some embodiments, the NG-C interface 1060 may perform one or more of: communicate control messages between CU-C 1030 and 5GC 1070; and/or other.

In some embodiments, one or more messages may be exchanged between two or more of the elements shown in FIG. 10. In a non-limiting example, such messages may be part of an F1-AP (an application protocol used on the control plane of the F1 interface). Example messages are shown in the table below. The direction of the messages (such as which components may exchange the messages) are also shown. In addition, example fields are also shown. Embodiments are not limited to the message names shown in the table. Embodiments are also not limited to the fields shown in the table or to the field names shown in the table. In some embodiments, one or more additional fields may be used in one or more messages. In some embodiments, a message shown in the table may not necessarily include all corresponding fields shown in the table.

| Message name | Direction | Main fields included |
|---|---|---|
| DU capability indication | DU→CU-C | Supported antenna and MIMO modes, supported frequency bands, hardware capacity (including computing and networking interface), and/or other. |
| DU configure | CU-C→DU | Radio frame structure (including scheduling of System Information Block), antenna installation, system Information intended for UE including Master Information Block (MIB), System Information Block (SIB) type x: x = 1,2,3, . . . similar to those defined in TS36.331, and/or other. |
| DU error indication | DU→CU-C | Cause of error, including hardware failure, outage of radio bearer, transport resource unavailable, and/or other. |
| Paging configure | CU-C→DU | Paging message from NG-Core to a specific group of UEs including UE Paging Identity chosen from S-TMSI or IMSI, message to notify the system information change or ETWS. |
| Radio bearer configure | CU-C→DU | UE Identity, signaling radio bearer (SRB)/data radio bearer (DRB) ID, Transport layer address of CU-U, all parameters of RLC, MAC and PHY that similar to those defined in 3GPP 36.331, such as RLC, MAC and PHY configure, and MAC control element (CE), and/or other. |
| UE context setup | CU-C→DU | UE identity, UE Aggregate Maximum Bit Rate (AMBR), QoS parameters implemented by the MAC layer (e.g. maximum latency, bit/packet error rate), and/or other. |
| UE context modify | CU-C→DU | UE identity, UE AMBR, QoS parameters implemented by the MAC layer (e.g maximum latency, bit/packet error rate), and/or other. |
| UE context release | CU-C→DU | UE Identity |
| UL RRC message transfer | DU→CU-C | UE Identity, RRC PDCP PDU or RRC PDU |
| DL RRC message transfer | CU-C→DU | UE Identity, RRC PDCP PDU or RRC PDU |

In some embodiments, a recipient (including but not limited to one of the elements shown in FIG. 10) may send a response and/or acknowledgement in response to a message from a sender (including but not limited to one of the elements shown in FIG. 10). In some embodiments, the CU-C 1030 may issue two kinds of paging configuration messages, depending on whether DU 1010 and CU-C 1030 are synchronized.

In some embodiments, if the DU 1010 and CU-C 1030 are synchronized and CU-C 1030 is aware of a paging occasion of a UE group, a related paging configuration message may include one or more of: the paging occasion that is intended for DU 1010; one or more UE paging identities; and/or other. In some cases, the UE paging identities may be transparently transferred to the intended UEs 102 by DU 1010.

In some embodiments, if the DU 1010 and the CU-C 1030 are not synchronized, the paging configuration message may include one or more UE paging identities. The DU 1010 may perform one or more of: grouping the corresponding UEs 102 according to their radio identities (including but not limited to C-RNTI), determining a paging occasion for each UE group, forming and sending over-the-air paging message for each UE group; and/or other.

In some embodiments, there may be at least two categories of system information (SI) that are to be delivered to the UE 102: minimum SI and on-demand SI. In some embodiments, minimum SI intended for a UE 102 may be formed by DU 1010 based at least partly on information included in a DU configuration message (and/or other message) received at the DU 1010 from the CU-C 1030.

In some embodiments, the minimum SI intended for UE 102 may be formed by the CU-C 1030 and may be included in a cell configuration message and/or other message sent by the CU-C 1030. The DU 1010 may determine an occasion to send the message.

In some embodiments, minimum SI intended for the UE 102 may be formed by CU-C 1030. The minimum SI may also indicate to DU 1010 an occasion in which the SI is to be sent to the UE 102.

In some embodiments, on-demand SI may be formed by CU-C 1030 based at least partly on a request from the UE 102. The on-demand SI may be sent to the DU 1010 in a message, including but not limited to a DL RRC message. The DU 1010 may receive the on-demand SI request from the UE 102 (such as in msg1 or msg3) and may send a message (including but not limited to an F1-AP on-demand SI request) to the CU-C 1030. The CU-C 1030 may respond with a message (including but not limited to a DL RRC message transfer F1-AP message). This message may include the SI information.

In some embodiments, if the on-demand SI is requested by msg1 or unencrypted msg3, the DU 1010 may generate the SI information and may send it to the UE 102. In some cases, relevant SI information may have already been configured in the DU 1010 (such as through usage of F1-AP signaling, OAM and/or other).

In some embodiments, one or more messages may be exchanged between two or more of the elements shown in FIG. 10. In a non-limiting example, such messages may be part of an E1-AP (an application protocol used on the E1 interface). Example messages are shown in the table below. The direction of the messages (such as which components may exchange the messages) are also shown. In addition, example fields are also shown. Embodiments are not limited to the message names shown in the table. Embodiments are also not limited to the fields shown in the table or to the field names shown in the table. In some embodiments, one or more additional fields may be used in one or more messages. In some embodiments, a message shown in the table may not necessarily include all corresponding fields shown in the table.

| Message name | Direction | Main fields included |
|---|---|---|
| E1 interface setup | CU-C→CU-U or CU-U→CU-C | CU-U id, potentially also global CU-C id. May also include CU-U capabilities (see below). Message exchange: E1 Setup Request, E1 Setup Response, E1 Setup Failure. |
| CU-U capability indication | CU-U→CU-C | Supported number of UEs (e.g. 100 UE with 1 Gbps each), supported networking interfaces (e.g. 20X10GE, 10X1GE), supported encryption/integrity protection algorithms, etc. |
| CU-U error indication | CU-U→CU-C | Cause of error, including outage of PDCP entity for a specific radio bearer, hardware failure, transport resource unavailable. etc. |
| Reset | CU-U→CU-C or CU-C→CU-U | PDCP-U id or DRB ID, TEID. Used to initialize PDCP-U or GTP-U entity after node setup or after any failure events |
| CU-U configure | CU-C→CU-U | Networking address of interfaces on F1-U/NG-U, encryption/integrity protection algorithms in use, percentage of dormant computing resource for energy saving etc. |
| Radio bearer configure | CU-C→CU-U | UE Identity, SDAP configure, DRB ID, DRB/SRB configure (PDCP configure), Transport layer/network address of DU. May also include |
| UE context setup | CU-C→CU-U | UE identity, AS Security keys, DRB/SRB configure |
| UE context modify | CU-C→CU-U | UE identity, AS security keys, DRB/SRB configure |
| UE context release | CU-C→CU-U | UE Identity |
| GTP-U end point configure | CP-C→CU-U | UE Identity, TEID, DRB ID, Transport layer/network address of 5GC |
| UL RRC message transfer | CU-U→CU-C | UE Identity, RRC PDU |
| DL RRC message transfer | CU-C→CU-U | UE Identity, RRC PDU |

In some embodiments, a recipient (including but not limited to one of the elements shown in FIG. 10) may send a response and/or acknowledgement in response to a message from a sender (including but not limited to one of the elements shown in FIG. 10).

In some embodiments, security keys used by CU-U 1030 for encryption/integrity protection may be configured by CU-C 1030 in a message. In some embodiments, the CU-C 1040 may transmit the message to the CU-U 1040. In a non-limiting example, the message may be a UE context setup/modify message. In some embodiments, the message may be sent as part of an initial AS security establishment. In some embodiments, the message may be sent as part of a change of security keys.

Referring to FIG. 11, an example 1100 is shown. In some embodiments, the example 1100 may be for one or more of: RRC connection establishment, RRC connection reconfiguration, security activation and/or other. The scope of embodiments is not limited in this respect, however, as one or more of the operations shown in FIG. 11 may be performed as part of other procedures/processes/methods. In some embodiments, one or more operations shown in FIG. 11 may be performed during an initial attach. In some embodiments, the example 1100 may be based at least partly on F1-U based on GTP-U. A TEID may include information regarding the identity of radio bearers. In the example 1100, one or more of the messages included in the above tables may be exchanged between DU 1010, CU-C 1030 and/or CU-U 1040. In some embodiments, various RRC messages (such as 1110-1114 and/or other) may be exchanged between the DU 1010 and the UE 102. In some embodiments, various RRC messages (such as 1121-1127 and/or other) may be exchanged between the DU 1010 and the CU-C 1030.

Referring to FIG. 12, an example 1200 is shown. In some embodiments, the example 1200 may be for intra CU-U handover. The scope of embodiments is not limited in this respect, however, as one or more of the operations shown in FIG. 12 may be performed as part of other procedures/processes/methods. In the example 1200, one or more of the messages included in the above tables may be exchanged between the UE 102, source DU 1010, target DU 1010, CU-C 1030 and/or CU-U 1040. In some embodiments, the handover may be from source DU 1010 to target DU 1010. In some embodiments, as part of the intra CU-U handover, the same CU-U 1040 may be used before and after the handover.

In some embodiments, a measurement operation (indicated by 1205) may include one or more of: transmission of a measurement report from UE 102 to source DU 1010; a UL RRC message transfer from source DU 1010 to CU-C 1030; and/or other. The measurement operation may at least partly trigger the handover procedure, in some embodiments.

In some embodiments, after a handover decision has been made by the CU-C 1030 (as indicated by 1210), the CU-C 1030 may send an RB configure message (as indicated by 1215) via E1 to CU-U 1040. In a non-limiting example, the RB configure message 1215 may indicate that a transport layer/network address is to change from source DU 1010 to target DU 1010.

In some embodiments, the CU-C 1030 may send a UE context setup message and/or RB configure message (as indicated by 1220) via F1-C to target DU 1010. In a non-limiting example, the message(s) indicated by 1220 may be used to set up UE context and radio bearers.

In some embodiments, the CU-C 1030 may send a DL RRC message (as indicated by 1212) via F1-C to source DU 1010. In a non-limiting example, the message may include information related to RRC connection reconfiguration.

In some embodiments, the source DU 1010 may send an RRC message (as indicated by 1213) to the UE 102. In some embodiments, the DU 1010 may transparently transfer the message 1212 to the UE 102.

In some embodiments, the UE context setup and RB configure message (indicated by 1220) sent from CU-C 1030 to target DU 1010 may be included in one message (including but not limited to a combined message). In some embodiments, the UE context setup and RB configure message (indicated by 1220) sent from CU-C 1030 to target DU 1010 may be separate messages.

Referring to FIG. 13, an example 1300 is shown. In some embodiments, the example 1300 may be for inter CU-U handover. The scope of embodiments is not limited in this respect, however, as one or more of the operations shown in FIG. 13 may be performed as part of other procedures/processes/methods. In the example 1300, one or more of the messages included in the above tables may be exchanged between the UE 102, source DU 1010, target DU 1010, CU-C 1030, source CU-U 1040 and/or target CU-U 1040. In some embodiments, the handover may be from source DU 1010 to target DU 1010. In some embodiments, as part of the inter CU-U handover, the source CU-U 1040 may be used before the handover and the target CU-U 1040 may be used after the handover.

In some embodiments, as indicated by 1310, the UE context may be set up in the target CU-U 1040.

In some embodiments, a user plane and control plane of a radio access system may be separated. The system may include at least the CU-C 1030, the CU-U As40 and the DU 1010.

In some embodiments, the CU-C 1030 may perform one or more of: radio resource control for UE 102; composition of RRC messages to UE 102 for connection control, handover, measurement, UE capability enquiry and/or other; transfer of NAS message between UE 102 and the core network; reception and analysis of RRC messages from UE 102 (such as measurement report, RRC connection request, acknowledgement of commands issued by the controller and/or other); issue of response(s); initiation of handover; performance of air interface control (such as cell configuration, setting up/modifying/deleting radio bearers that transfer data or signaling with UE 102, setting up/releasing UE context and/or other); performance of radio resource management (such as admission control, load balancing, mobility control and/or other); implementation of NG2 AP with the core network to support mobility management and session management; performance of CU-U control; intra-CU mobility management; load balancing; support of inter-CU mobility and/or other.

In some embodiments, the CU-U 1040 may control transfer of data between UE 102 (via DU 1010) and NG-Core.

In some embodiments, the DU 1010 may transfer control-plane messages and user data towards UE 102.

In some embodiments, the system may comprise an interface between CU-C 1030 and CU-U 1040 that may transfer signaling to support part of the functions at CU-C 1030 and CU-U 1040. In some embodiments, the system may comprise an interface between the CU-C 1030 and DU 1010 that transfers signaling to support part of the functions at CU-C 1030 and DU 1010. In some embodiments, the system may comprise an interface between CU-C 1030 and DU 1010 that transfers signaling/data to support part of the functions at CU-C 1030 and DU 1010.

In some embodiments, the CU-C 1030 may perform function(s) related to one or more of: PDCP of SRB, RRC, RRM, NG2 AP, inter-gNB AP and/or other control functions. In some embodiments, the CU-U 1040 may perform function(s) related to one or more of: SDAP. PDCP of DRB (or SRB) and GTP-U end point. In some embodiments, the DU 1010 may perform function(s) related to one or more of: RLC, MAC and PHY.

In Example 1, an apparatus of a Next Generation Node-B (gNB) may comprise processing circuitry. The apparatus may further comprise memory. The gNB may be configured with logical nodes including a gNB central unit (gNB-CU) and a gNB distributed unit (gNB-DU). The gNB-CU may comprise a gNB-CU control plane (gNB-CU-CP) for control-plane functionality, a gNB-CU user plane (gNB-CU-UP) for user-plane functionality. The gNB-CU-CP may be configured to communicate with the gNB-CU-UP over an E1 interface. The gNB-CU-UP may be configured to communicate user plane messages with the gNB-DU over an F user-plane interface (F1-U). The gNB-CU-CP may be configured to communicate control plane messages with the gNB-DU over an F1 control plane interface (F1-C). The processing circuitry may be configured to initiate an E1 interface setup procedure to establish the E1 interface by sending a GNB-CU-UP E1 setup request message from the gNB-CU-UP to the gNB-CU-CP. The processing circuitry may be further configured to initiate a bearer context setup procedure to establish a bearer context in the gNB-CU-UP by sending a bearer context setup request message from the gNB-CU-CP to the gNB-CU-UP over the E1 interface. The processing circuitry may be further configured to initiate a UE context setup procedure to establish UE context by sending a UE context setup request message from the gNB-CU-CP to the gNB-DU over the F1-C, the UE context including a signaling radio bearer (SRB) configuration and a data radio bearer (DRB) configuration. The processing circuitry may be further configured to transfer an initial radio-resource control (RRC) message as an uplink (UL) PDCP-PDU from the gNB-DU to the gNB-CU-CP over the F1-C. The UE context setup request message may be configured to include quality-of-service parameters for the DRB configuration. The memory may be configured to store the DRB configuration.

In Example 2, the subject matter of Example 1, wherein the gNB-DU may be configured to host radio-link control (RLC), medium-access control (MAC) and physical (PHY) layers of the gNB. The gNB-DU may be configured to communicate with user equipment over a user interface (uu).

In Example 3, the subject matter of one or any combination of Examples 1-2, wherein the bearer context setup procedure may be performed after completion of the E1 interface setup procedure.

In Example 4, the subject matter of one or any combination of Examples 1-3, wherein the processing circuitry may be further configured to transfer an RRC message as a downlink (DL) Packet Data Convergence Protocol (PDCP) Protocol Data Unit (PDU) to the gNB-DU from the gNB-CU-CP over the F1-C.

In Example 5, the subject matter of one or any combination of Examples 1-4, wherein the UE context setup request message may further include one or more of: an aggregate maximum bit rate (AMBR), a latency, a bit error rate, and a packet error rate.

In Example 6, the subject matter of one or any combination of Examples 1-5, wherein the processing circuitry may be further configured to send to the gNB-DU, a UE context modify request message that includes an updated value of one of the parameters of the UE context setup request message.

In Example 7, the subject matter of one or any combination of Examples 1-6, wherein the processing circuitry may be further configured to send to the gNB-DU on the F1 interface, a UE context release request message to indicate that a DRB is to be released.

In Example 8, the subject matter of one or any combination of Examples 1-7, wherein the gNB-CU-CP may be configured to send to the gNB-CU-UP, a second UE context setup request message that includes an access stratum (AS) security key for encryption and decryption of the data packets of the DRB.

In Example 9, the subject matter of one or any combination of Examples 1-8, wherein the processing circuitry may be further configured to receive, from a core network (CN), control signaling that indicates that the UE is to be paged for reception of a downlink data packet. The processing circuitry may be further configured to send to the gNB-DU, a paging configure message that indicates: a paging identity of a UE, or a paging occasion of in which the UE is to be paged.

In Example 10, the subject matter of one or any combination of Examples 1-9, wherein the processing circuitry may be further configured to send to the gNB-DU for broadcast, minimum system information (SI) that includes a master information block (MIB) and a type 1 SI block (SIB-1).

In Example 11, the subject matter of one or any combination of Examples 1-10, wherein the processing circuitry may be further configured to receive, from the gNB-DU, a request from a UE for on-demand system information (SI) related to a capability of the UE to camp on a cell that includes the disaggregated gNB. The processing circuitry may be further configured to send to the gNB-DU on the F1 interface, a downlink RRC message transfer that includes the on-demand SI.

In Example 12, the subject matter of one or any combination of Examples 1-11, wherein the processing circuitry may be further configured to receive, from the gNB-DU, an uplink RRC message transfer that includes one or more measurement reports or a response to an RRC connection request from the UE. The processing circuitry may be further configured to send to the gNB-DU on the F1 interface, a downlink RRC message transfer to configure, reconfigure, or release an RRC connection at the UE.

In Example 13, a computer-readable storage medium may store instructions for execution by processing circuitry of a Next Generation Node-B (gNB). The gNB may be configured with logical nodes including a gNB central unit (gNB-CU) and a gNB distributed unit (gNB-DU). The gNB-CU may comprise a gNB-CU control plane (gNB-CU-CP) for control-plane functionality, a gNB-CU user plane (gNB-CU-UP) for user-plane functionality. The gNB-CU-CP may be configured to communicate with the gNB-CU-UP over an E1 interface, the gNB-CU-UP configured to communicate user plane messages with the gNB-DU over an F1 user-plane interface (F1-U). The gNB-CU-CP may be configured to communicate control plane messages with the gNB-DU over an F1 control plane interface (F1-C). The operations may configure the processing circuitry to initiate an E1 interface setup procedure to establish the E1 interface. The operations may further configure the processing circuitry to initiate an error indication procedure to indicate a cause of error for a UE. The operations may further configure the processing circuitry to initiate a bearer context setup procedure to establish a bearer context in the gNB-CU-UP by sending a bearer context setup request message from the gNB-CU-CP to the gNB-CU-UP over the E1 interface. The operations may further configure the processing circuitry to initiate a UE context setup procedure to establish UE context by sending a UE context setup request message from the gNB-CU-CP to the gNB-DU over the F1-C, the UE context including a signaling radio bearer (SRB) and a data radio bearer (DRB) configuration. The operations may further configure the processing circuitry to transfer an initial radio-resource control (RRC) message as an uplink (UL) PDCP-PPDU from the gNB-DU to the gNB-CU-CP over the F1-C. The UE context setup request message may be configured to include quality-of-service parameters for the DRB configuration.

In Example 14, the subject matter of Example 13, wherein the gNB-DU may be configured to host radio-link control (RLC), medium-access control (MAC) and physical (PHY) layers of the gNB. The gNB-DU may be configured to communicate with User Equipment (UE) over a user interface (uu).

In Example 15, the subject matter of one or any combination of Examples 13-14, wherein the bearer context setup procedure may be performed after completion of the E1 interface setup procedure.

In Example 16, the subject matter of one or any combination of Examples 13-15, wherein the operations may further configure the processing circuitry to transfer an RRC message as a downlink (DL) PDCP-PDU to the gNB-DU from the gNB-CU-CP over the F1-C.

In Example 17, the subject matter of one or any combination of Examples 13-16, wherein the UE context setup request message may further include one or more of: an aggregate maximum bit rate (AMBR), a latency, a bit error rate, and a packet error rate.

In Example 18, the subject matter of one or any combination of Examples 13-17, wherein the operations may further configure the processing circuitry to initiate the E1 interface setup procedure by: sending a GNB-CU-UP E1 setup request message from the gNB-CU-UP to the gNB-CU-CP or sending a GNB-CU-CP E1 setup request message from the gNB-CU-CP to the gNB-CU-UP.

In Example 19, an apparatus of a Next Generation Node-B (gNB) may comprise processing circuitry. The apparatus may further comprise memory. The gNB may be configured with logical nodes including a gNB central unit (gNB-CU) and a gNB distributed unit (gNB-DU). The gNB-CU may comprise a gNB-CU control plane (gNB-CU-CP) for control-plane functionality, a gNB-CU user plane (gNB-CU-UP) for user-plane functionality. The gNB-CU-CP may be configured to communicate with the gNB-CU-UP over an E1 interface. The gNB-CU-UP may be configured to communicate user plane messages with the gNB-DU over an F1 user-plane interface (F1-U). The gNB-CU-CP may be configured to communicate control plane messages with the gNB-DU over an F1 control plane interface (F1-C). The processing circuitry may be configured to initiate a UE context setup procedure to establish UE context by sending a UE context setup request message from the gNB-CU-CP to the gNB-DU over the F1-C, the UE context including a signaling radio bearer (SRB) and a data radio bearer (DRB) configuration. The processing circuitry may be further configured to transfer an initial radio-resource control (RRC) message as an uplink (UL) PDCP-PPDU from the gNB-DU to the gNB-CU-CP over the F1-C. The processing circuitry may be further configured to transfer another RRC message as a downlink (DL) PDCP-PDU to the gNB-DU from the gNB-CU-CP over the F1-C. The UE context setup request message may be configured to include quality-of-service parameters for the DRB configuration. The memory may be configured to store the DRB configuration.

In Example 20, the subject matter of Example 19, wherein the gNB-DU may be configured to host radio-link control (RLC), medium-access control (MAC) and physical (PHY) layers of the gNB. The gNB-DU may be configured to communicate with User Equipment (UE) over a user interface (uu).

In Example 21, the subject matter of one or any combination of Examples 19-20, wherein the processing circuitry may be further configured to initiate an E1 interface setup procedure to establish the E1 interface by sending a GNB-CU-UP E1 setup request message from the gNB-CU-UP to the gNB-CU-CP or by sending a GNB-CU-CP E1 setup request message from the gNB-CU-CP to the gNB-CU-UP. The processing circuitry may be further configured to initiate an error indication procedure to indicate the cause of error for a UE. The processing circuitry may be further configured to initiate a bearer context setup procedure to establish a bearer context in the gNB-CU-UP by sending a bearer context setup request message from the gNB-CU-CP to the gNB-CU-UP over the E1 interface. The bearer context setup procedure may be performed after completion of the E1 interface setup procedure.

In Example 22, the subject matter of one or any combination of Examples 19-21, wherein the gNB-CU-CP may be configured to send, to the gNB-CU-UP, another UE context setup request message that includes an access stratum (AS) security key for encryption and decryption of the data packets of the DRB.

In Example 23, the subject matter of one or any combination of Examples 19-22, wherein the UE context setup request message may further include one or more of: an aggregate maximum bit rate (AMBR), a latency, a bit error rate, and a packet error rate.

In Example 24, a Next Generation Node-B (gNB) may be configured with logical nodes including a gNB central unit (gNB-CU) and a gNB distributed unit (gNB-DU). The gNB-CU may comprise a gNB-CU control plane (gNB-CU-CP) for control-plane functionality, a gNB-CU user plane (gNB-CU-UP) for user-plane functionality. The gNB-CU-CP may be configured to communicate with the gNB-CU-UP over an E1 interface. The gNB-CU-UP may be configured to communicate user plane messages with the gNB-DU over an F1 user-plane interface (F1-U). The gNB-CU-CP may be configured to communicate control plane messages with the gNB-DU over an F1 control plane interface (F1-C). An apparatus of the gNB may comprise means for initiating an E1 interface setup procedure to establish the E1 interface. The apparatus may further comprise means for initiating an error indication procedure to indicate a cause of error for a UE. The apparatus may further comprise means for initiating a bearer context setup procedure to establish a bearer context in the gNB-CU-UP by sending a bearer context setup request message from the gNB-CU-CP to the gNB-CU-UP over the E1 interface. The apparatus may further comprise means for initiating a UE context setup procedure to establish UE context by sending a UE context setup request message from the gNB-CU-CP to the gNB-DU over the F1-C, the UE context including a signaling radio bearer (SRB) and a data radio bearer (DRB) configuration. The apparatus may further comprise means for transferring an initial radio-resource control (RRC) message as an uplink (UL) PDCP-PPDU from the gNB-DU to the gNB-CU-CP over the F1-C.

The UE context setup request message may be configured to include quality-of-service parameters for the DRB configuration.

In Example 25, the subject matter of Example 24, wherein the gNB-DU may be configured to host radio-link control (RLC), medium-access control (MAC) and physical (PHY) layers of the gNB. The gNB-DU may be configured to communicate with User Equipment (UE) over a user interface (uu).

In Example 26, the subject matter of one or any combination of Examples 24-25, wherein the bearer context setup procedure may be performed after completion of the E1 interface setup procedure.

In Example 27, the subject matter of one or any combination of Examples 24-26, wherein the apparatus may further comprise means for transferring an RRC message as a downlink (DL) PDCP-PDU to the gNB-DU from the gNB-CU-CP over the F1-C.

In Example 28, the subject matter of one or any combination of Examples 24-27, wherein the UE context setup request message may further include one or more of: an aggregate maximum bit rate (AMBR), a latency, a bit error rate, and a packet error rate.

In Example 29, the subject matter of one or any combination of Examples 24-28, wherein the apparatus may further comprise means for initiating the E1 interface setup procedure by: sending a GNB-CU-UP E1 setup request message from the gNB-CU-UP to the gNB-CU-CP; or sending a GNB-CU-CP E1 setup request message from the gNB-CU-CP to the gNB-CU-UP.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
    logical nodes including a gNB central unit (gNB-CU) and a gNB distributed unit (gNB-DU), the gNB-CU comprising a gNB-CU control plane (gNB-CU-CP) for control-plane functionality, a gNB-CU user plane (gNB-CU-UP) for user-plane functionality, the gNB-CU-CP configured to communicate with the gNB-CU-UP over an E1 interface, the gNB-CU-UP configured to communicate user plane messages with the gNB-DU over an F1 user-plane interface (F1-U), the gNB-CU-CP configured to communicate control plane messages with the gNB-DU over an F1 application protocol (F1-AP) used on an F1 control plane interface (F1-C), wherein the apparatus is configured to:
        transmit or receive first messages according to an E1 application protocol (E1-AP), the first messages including:
            a GNB-CU-UP E1 setup request message from the gNB-CU-UP to the gNB-CU-CP, wherein the E1 setup request message includes a gNB-CU-UP ID that is at least a local ID;
            a radio bearer configuration message from the gNB-CU-CP to the gNB-CU-UP over the E1 interface to configure one or more data radio bearers (DRBs), wherein the radio bearer configuration message includes a user equipment ID and a DRB ID;
            a reset message over the E1 interface from the gNB-CU-UP to the gNB-CU-CP or from the gNB-CU-CP to the gNB-CU-UP;
            an error indication message over the E1 interface from the gNB-CU-UP to the gNB-CU-CP indicating a cause of the error;
        transmit or receive second messages according to the F1-AP, the second messages including:
            a UE context setup request message from the gNB-CU-CP to the gNB-DU over the F1-C, wherein the UE context setup message is configured to include quality-of-service parameters;
            a UE context modify message from the gNB-CU-CP to the gNB-DU over the F1-C, wherein the UE context modify message is configured to include quality-of-service parameters;
            a UE context release message from the gNB-CU-CP to the gNB-DU over the F1-C; and
            an uplink radio-resource control (RRC) message including a PDCP-PDU from the gNB-DU to the gNB-CU-CP over the F1-C.

2. The apparatus of claim 1, wherein the gNB-DU is configured to host radio-link control (RLC), medium-access control (MAC) and physical (PHY) layers of the gNB, and wherein the gNB-DU is configured to communicate with user equipment over a user interface (uu).

3. The apparatus of claim 1, wherein a bearer context setup procedure is performed after completion of an E1 interface setup procedure.

4. The apparatus of claim 1, wherein the apparatus is further configured to transfer an RRC message as a downlink (DL) Packet Data Convergence Protocol (PDCP) Protocol Data Unit (PDU) to the gNB-DU from the gNB-CU-CP over the F1-C.

5. The apparatus of claim 1, wherein the UE context setup request message further includes one or more of: an aggregate maximum bit rate (AMBR), a latency, a bit error rate, and a packet error rate.

6. The apparatus of claim 1, wherein the UE context modify request message includes an updated value of one of the parameters of the UE context setup request message.

7. The apparatus of claim 1, wherein the UE context release request message indicates that a DRB is to be released.

8. The apparatus of claim 1, wherein the gNB-CU-CP is configured to send to the gNB-CU-UP, a second UE context setup request message that includes an access stratum (AS) security key for encryption and decryption of data packets of a DRB.

9. The apparatus of claim 1, wherein the apparatus is further configured to:
    receive, from a core network (CN), control signaling that indicates that the UE is to be paged for reception of a downlink data packet; and
    send to the gNB-DU, a paging configure message that indicates: a paging identity of a UE, or a paging occasion of in which the UE is to be paged.

10. The apparatus of claim 1, wherein the apparatus is further configured to:
    send to the gNB-DU for broadcast, minimum system information (SI) that includes a master information block (MIB) and a type 1 SI block (SIB-1).

11. The apparatus of claim 1, wherein the apparatus is further configured to:
   receive, from the gNB-DU, a request from a UE for on-demand system information (SI) related to a capability of the UE to camp on a cell that includes the disaggregated gNB; and
   send to the gNB-DU on the F1 interface, a downlink RRC message transfer that includes the on-demand SI.

12. The apparatus of claim 1, wherein the apparatus is further configured to:
   receive, from the gNB-DU, an uplink RRC message transfer that includes one or more measurement reports or a response to an RRC connection request from the UE; and
   send to the gNB-DU on the F1 interface, a downlink RRC message transfer to configure, reconfigure, or release an RRC connection at the UE.

13. A Next Generation Node B (gNB) comprising:
   logical nodes including a gNB central unit (gNB-CU) and a gNB distributed unit (gNB-DU), the gNB-CU comprising a gNB-CU control plane (gNB-CU-CP) for control-plane functionality, a gNB-CU user plane (gNB-CU-UP) for user-plane functionality, the gNB-CU-CP configured to communicate with the gNB-CU-UP over an E1 interface, the gNB-CU-UP configured to communicate user plane messages with the gNB-DU over an F1 user-plane interface (F1-U), the gNB-CU-CP configured to communicate control plane messages with the gNB-DU over an F1 application protocol (F1-AP) used on an F1 control plane interface (F1-C), wherein the apparatus is configured to:
      transmit or receive first messages according to an E1 application protocol (E1-AP), the first messages including: a GNB-CU-UP E1 setup request message from the gNB-CU-UP to the gNB-CU-CP, wherein the E1 setup request message includes a gNB-CU-UP ID that is at least a local ID;
         a radio bearer configuration message from the gNB-CU-CP to the gNB-CU-UP over the E1 interface to configure one or more data radio bearers (DRBs), wherein the radio bearer configuration message includes a user equipment ID and a DRB ID;
         a reset message over the E1 interface from the gNB-CU-UP to the gNB-CU-CP or from the gNB-CU-CP to the gNB-CU-UP;
         an error indication message over the E1 interface from the gNB-CU-UP to the gNB-CU-CP indicating a cause of the error;
      transmit or receive second messages according to the F1-AP, the second messages including:
         a UE context setup request message from the gNB-CU-CP to the gNB-DU over the F1-C, wherein the UE context setup message is configured to include quality-of-service parameters;
         a UE context modify message from the gNB-CU-CP to the gNB-DU over the F1-C, wherein the UE context modify message is configured to include quality-of-service parameters;
         a UE context release message from the gNB-CU-CP to the gNB-DU over the F1-C; and
         an uplink radio-resource control (RRC) message including a PDCP-PDU from the gNB-DU to the gNB-CU-CP over the F1-C.

14. The gNB of claim 13, wherein a bearer context setup procedure is performed after completion of an E1 interface setup procedure.

15. The gNB of claim 13, wherein the gNB is further configured to transfer an RRC message as a downlink (DL) Packet Data Convergence Protocol (PDCP) Protocol Data Unit (PDU) to the gNB-DU from the gNB-CU-CP over the F1-C.

16. The gNB of claim 13, wherein the UE context setup request message further includes one or more of: an aggregate maximum bit rate (AMBR), a latency, a bit error rate, and a packet error rate.

17. A method for operating a Next Generation Node B (gNB) comprising:
   logical nodes including a gNB central unit (gNB-CU) and a gNB distributed unit (gNB-DU), the gNB-CU comprising a gNB-CU control plane (gNB-CU-CP) for control-plane functionality, a gNB-CU user plane (gNB-CU-UP) for user-plane functionality, the gNB-CU-CP configured to communicate with the gNB-CU-UP over an E1 interface, the gNB-CU-UP configured to communicate user plane messages with the gNB-DU over an F1 user-plane interface (F1-U), the gNB-CU-CP configured to communicate control plane messages with the gNB-DU over an F1 application protocol (F1-AP) used on an F1 control plane interface (F1-C), wherein the method comprises:
      transmitting or receiving first messages according to an E1 application protocol (E1-AP), the first messages including: a GNB-CU-UP E1 setup request message from the gNB-CU-UP to the gNB-CU-CP, wherein the E1 setup request message includes a gNB-CU-UP ID that is at least a local ID;
         a radio bearer configuration message from the gNB-CU-CP to the gNB-CU-UP over the E1 interface to configure one or more data radio bearers (DRBs), wherein the radio bearer configuration message includes a user equipment ID and a DRB ID;
         a reset message over the E1 interface from the gNB-CU-UP to the gNB-CU-CP or from the gNB-CU-CP to the gNB-CU-UP;
         an error indication message over the E1 interface from the gNB-CU-UP to the gNB-CU-CP indicating a cause of the error;
      transmitting or receiving second messages according to the F1-AP, the second messages including:
         a UE context setup request message from the gNB-CU-CP to the gNB-DU over the F1-C, wherein the UE context setup message is configured to include quality-of-service parameters;
         a UE context modify message from the gNB-CU-CP to the gNB-DU over the F1-C, wherein the UE context modify message is configured to include quality-of-service parameters;
         a UE context release message from the gNB-CU-CP to the gNB-DU over the F1-C; and
         an uplink radio-resource control (RRC) message including a PDCP-PDU from the gNB-DU to the gNB-CU-CP over the F1-C.

18. The method of claim 17, wherein a bearer context setup procedure is performed after completion of an E1 interface setup procedure.

19. The method of claim 17, wherein the method further comprises transferring an RRC message as a downlink (DL) Packet Data Convergence Protocol (PDCP) Protocol Data Unit (PDU) to the gNB-DU from the gNB-CU-CP over the F1-C.

20. The method of claim 17, wherein the UE context setup request message further includes one or more of: an aggregate maximum bit rate (AMBR), a latency, a bit error rate, and a packet error rate.

\* \* \* \* \*